United States Patent
Kobayashi

(10) Patent No.: US 9,202,356 B1
(45) Date of Patent: Dec. 1, 2015

(54) SHUTTER FOR LIMITING IMAGE CAPTURING AREA

(71) Applicant: PANASONIC INTELLECTUAL PROPERTY MANAGEMENT CO., LTD., Osaka (JP)

(72) Inventor: Takafumi Kobayashi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/468,571

(22) Filed: Aug. 26, 2014

(51) Int. Cl.
*H04N 5/225* (2006.01)
*G08B 13/196* (2006.01)

(52) U.S. Cl.
CPC ........ *G08B 13/19619* (2013.01); *H04N 5/2252* (2013.01)

(58) Field of Classification Search
CPC ............... G08B 13/19619; G08B 13/19617; H04N 5/2252
See application file for complete search history.

(56) References Cited

U.S. PATENT DOCUMENTS

| | | | |
|---|---|---|---|
| 5,765,043 A * | 6/1998 | Tyler | 396/12 |
| 7,874,744 B2 * | 1/2011 | Cirker | 396/427 |
| 8,123,419 B2 | 2/2012 | Cirker | |
| 2008/0224862 A1 | 9/2008 | Cirker | |
| 2009/0080878 A1 | 3/2009 | Cirker | |
| 2009/0160673 A1 | 6/2009 | Cirker | |
| 2010/0019927 A1 | 1/2010 | Cirker | |
| 2011/0103786 A1 | 5/2011 | Cirker | |
| 2012/0113263 A1 | 5/2012 | Cirker | |
| 2012/0314063 A1 | 12/2012 | Cirker | |
| 2015/0172520 A1 * | 6/2015 | Lindman et al. | H04N 5/2252 |

OTHER PUBLICATIONS

U.S. Appl. No. 14/086,193 to Enomomto, filed Nov. 21, 2013.
U.S. Appl. No. 14/160,819 to Enomoto et al., filed Jan. 22, 2014.
U.S. Appl. No. 14/468,718, filed Aug. 26, 2014.

* cited by examiner

*Primary Examiner* — W B Perkey
(74) *Attorney, Agent, or Firm* — Greenblum & Bernstein P.L.C.

(57) ABSTRACT

A shutter apparatus limits an image capturing area of an image-capturing apparatus for capturing an image. The shutter apparatus includes a base in which a hole is formed, and a restricting member that surrounds the image-capturing apparatus, wherein the restricting member is divided into a plurality of members, each being operated independently, and received and protruded through the hole of the base.

18 Claims, 16 Drawing Sheets

FIG. 6

| | CAMERA 200A (IP ADDRESS: IpA) | CAMERA 200B (IP ADDRESS: IpB) | CAMERA 200C (IP ADDRESS: IpC) | CAMERA 200D (IP ADDRESS: IpD) | CAMERA 200E (IP ADDRESS: IpE) |
|---|---|---|---|---|---|
| SENSOR 510A1 | PRESET AP1 | PRESET BP2 | PRESET CP2 | PRESET DP1 | PRESET EP4 |
| SENSOR 510A2 | PRESET AP3 | PRESET BP3 | PRESET CP1 | | PRESET EP2 |
| SENSOR 510C1 | PRESET AP3 | PRESET BP3 | PRESET CP1 | | PRESET EP2 |
| SENSOR 510C2 | PRESET AP2 | PRESET BP4 | PRESET CP4 | PRESET DP3 | PRESET EP3 |
| SENSOR 510E1 | | PRESET BP1 | PRESET CP3 | PRESET DP2 | PRESET EP1 |
| SENSOR 510E2 | PRESET AP2 | PRESET BP4 | PRESET CP4 | PRESET DP3 | PRESET EP3 |

T11

SHUTTER FOR LIMITING IMAGE CAPTURING AREA

BACKGROUND

1. Technical Field

The present invention relates to a shutter for limiting an image capturing area of an image-capturing apparatus.

2. Background Art

In a related art, a camera system that includes a camera device and a shutter which covers the camera device, and exposes or obstructs the camera lens depending on the opening and closing of the shutter, is known. In the camera system, in a case where the shutter is in a closed state, the camera lens is obstructed and privacy of a person who is present in the image capturing area of the camera device can be protected. In a case where the shutter is in an open state, the camera lens is exposed and an image of a subject that is present in the image capturing area of the camera device is captured, and then security can be protected.

SUMMARY

In the camera system of the related art, it is insufficient to protect the privacy or to secure the security.

An aspect of the present invention provides a shutter apparatus including a restricting member which is divided into a plurality of members, each being operated independently, and surrounds an image-capturing apparatus.

According to the aspect of the present invention, it is possible to improve the level of protecting the privacy or ensuring the security.

BRIEF DESCRIPTION OF THE DRAWINGS

In the accompanying drawings:

FIG. 6 is a schematic diagram illustrating an example of an information table which shows the relationship between each sensor and a preset position of each camera device in the embodiment;

DETAILED DESCRIPTION

Hereinafter, an embodiment of the present invention will be described with reference to the drawings.

Figure 1:
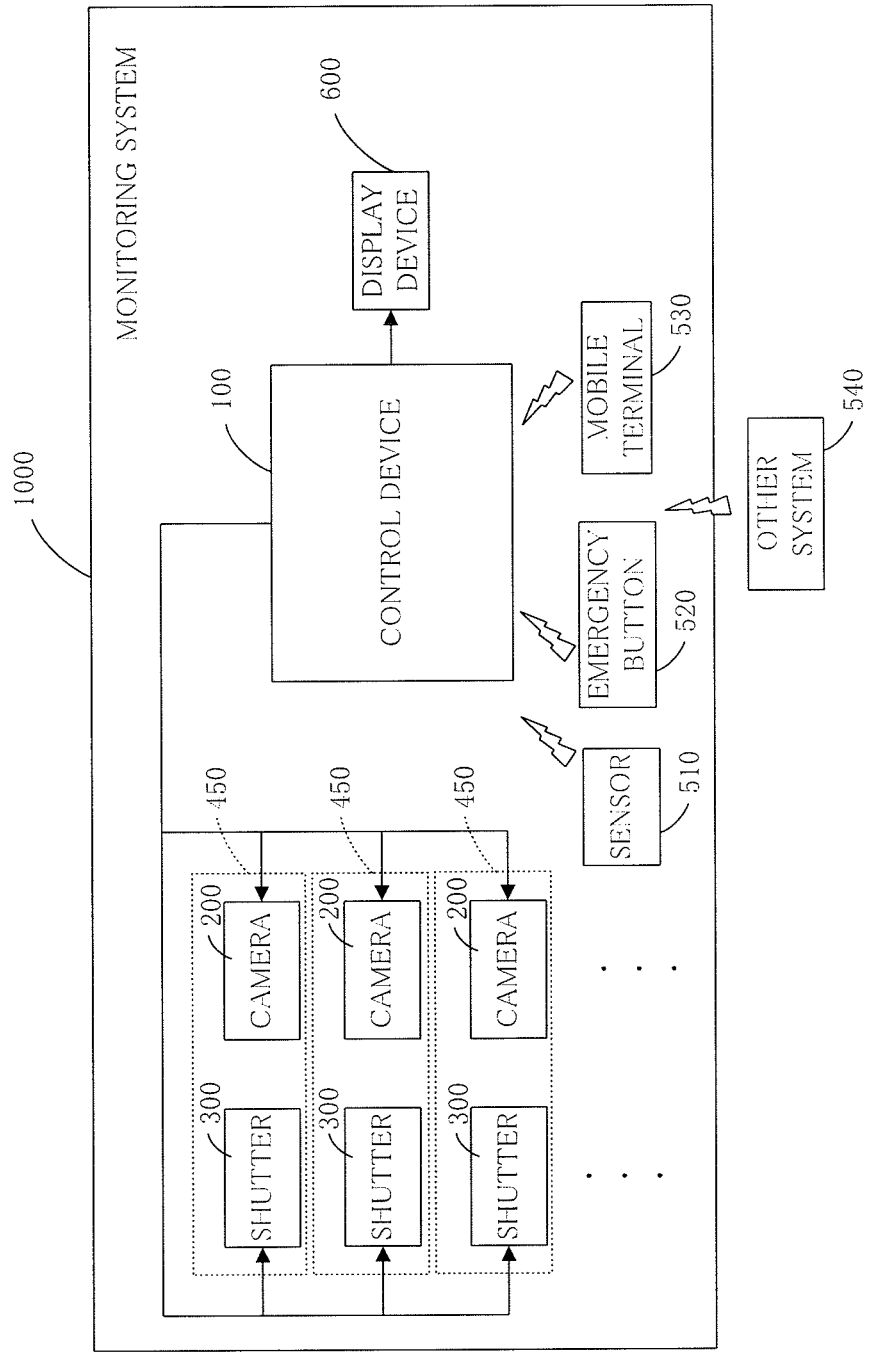
FIG. 1 is a block diagram illustrating a configuration example of a monitoring system in an embodiment.

FIG. 1 is a block diagram illustrating a configuration example of a monitoring system 1000 in the embodiment. The monitoring system 1000 includes a control device 100, a camera device 200, a shutter 300, a sensor 510, an emergency button 520, a mobile terminal 530, and a display device 600. The sensor 510, the emergency button 520, or the mobile terminal 530 can be omitted.

The control device 100 is, for example, disposed in the monitoring center and operates as a monitoring server. Alternatively, the control device 100 may be, for example, disposed for each camera device 200 or for each predetermined area where one or more camera devices 200 are arranged, and may be in cooperation with the central server of the monitoring center.

The camera device 200 is installed on the wall or ceiling of, for example, various facilities, a predetermined room in the facilities, or a predetermined area of the room in the facilities. The camera device 200 is, for example, capable of rotating in a panning direction and in a tilting direction, and captures an image of a subject which is present in a predetermined area. The camera device 200, for example, includes an omni-directional camera and a PTZ camera and operates as a network camera.

The PTZ camera as an example of the camera device 200 is a camera capable of changing the image capturing area (image capturing direction and zoom factor) by a PTZ operation. The PTZ operation is an operation that includes at least one of panning (P), tilting (T), and zooming (Z). In addition, the PTZ camera is controlled in PTZ by the control device 100. The PTZ control is a control that includes at least one of the panning control (P), the tilting control (T), and the zooming control (Z).

The omni-directional camera as an example of the camera device 200 captures an omni-directional image in all area. The omni-direction (all direction) means, for example, all around (360 degrees) of the camera device 200 (for example, all direction of planes along the X-Y plane). In the omni-directional camera, the PTZ operation is implemented by software. An arbitrary area in the capturable area of the omni-directional camera is masked (unselected) by the control device 100 or the camera device 200 after the image capturing in the omni-directional image capturing area.

The shutter 300 is driven by a drive member in response to the instruction signal from the control device 100 and then opened and closed. Therefore, the shutter 300 limits the image capturing area captured by the camera device 200. Namely, the image capturing area is narrowed when the shutter 300 closes, and the image capturing area is widened when the shutter 300 opens.

The shutter 300, in a closed state, visually obstructs the front surface of the camera lens 260 (refer to FIG. 2A) in the image capturing direction of the camera device 200. As a result, the image capturing by the camera device 200 becomes impossible. In addition, the shutter 300, in an open state, visually opens the front surface of the camera lens 260 (refer to FIG. 2C) in the image capturing direction of the camera device 200. As a result, the image capturing by the camera device 200 becomes possible.

When the shutter 300 is in the open state, the camera lens 260 is in a state of being visible and recognizable by a person who exists in the area where the camera device 200 is disposed. The shutter 300 may be in an intermediate state in which a part of the image capturing area of the camera device 200 is limited (refer to FIG. 2B). In the intermediate state, there may be a plurality of states according to a degree of limitation.

Another example of the structure of the shutter 300 is, for example, described in U.S. Pat. No. 8,123,419, the contents of which are incorporated herein by reference.

One or more camera devices 200 and shutters 300 are respectively provided in the monitoring system 1000. For example, one shutter 300 is provided for each camera device 200. The shutter 300 may not be provided separately from the camera device 200, but the shutter 300 and the camera device 200 may be configured integrally with each other as illustrated by a reference numeral 450 in FIG. 1.

The sensor 510 includes various sensors that measure, for example, a mechanical, an electromagnetic, a thermal, an acoustic, or a chemical property in the predetermined area, and convert the measured result to a predetermined signal. The sensor 510 broadly includes, for example, a motion sensor, a smoke sensor (a smoke detector), a human sensor, a door opening and closing sensor, a window opening and closing sensor, an infrared sensor, a light sensor, a magnetic sensor, a temperature sensor, a voice sensor, a distance measuring sensor, a position sensor, and other sensors.

The emergency button 520 includes, for example, an emergency button fixedly installed in the predetermined area.

The mobile terminal 530 includes, for example, a smart phone, a personal digital assistant, a pendant microphone (a pendant-type infrared wireless microphone), various remote controllers, a portable emergency warning apparatus, a personal computer (PC), and other operational equipment.

Another system 540 includes, for example, a visiting and leaving management system that manages the visiting and leaving in a predetermined area, and an authentication system that authenticates a person to enter a predetermined area.

In a case where the sensor 510 detects predetermined information, the sensor 510, for example, informs the control device 100 of the predetermined information via the network.

The emergency button 520 is pressed by a person who exists in a predetermined area, and for example, informs the control device 100 of the information indicating that the emergency button 520 is pressed, via the network.

The sensor 510 or the emergency button 520 may be incorporated in the camera device 200. Alternatively, one or more sensors 510 or the emergency buttons 520 may be provided for each predetermined area, or one or more sensors 510 or the emergency buttons 520 may be provided for each camera device 200.

The mobile terminal 530 is, for example, possessed by a user, and includes a communication unit, operation unit, control unit, and various sensors. The mobile terminal 530 informs, for example, when predetermined information is detected or a predetermined button is pressed, the control device 100 of the predetermined information or the information indicating that the predetermined button is pressed, via the network.

The other system 540 includes, for example, various systems provided separately from the monitoring system 1000 (for example, the visiting and leaving management system 2000 (refer to FIG. 7) and the authentication system). The other system 540 informs the control device 100 in the monitoring system 1000, for example, of the information obtained by the processing in the other systems 540 via, for example, the network.

The information from at least one of the sensor 510, the emergency button 520, the mobile terminal 530, and the other systems 540 may be reported to the camera device 200 instead of being reported to the control device 100.

The display device 600 is disposed, for example, at the monitoring center. As a result, a security guard can visually recognize and monitor the predetermined area. The display device 600 may be, for example, a large screen display installed at the monitoring center or may be a small display on a mobile terminal which the security guard has for security activity. In the display device 600, for example, a plurality of areas may be displayed on the divided screen, or a captured image of one area combined with information about the area may be displayed on the screen.

For example, warning information may be displayed on the display device 600 in a case where a threat occurs in a predetermined area. Alternatively, the warning information may be transmitted to another communication device, and inform by, for example, image or sound, instead of being displayed on the display device 600.

Figure 2A:
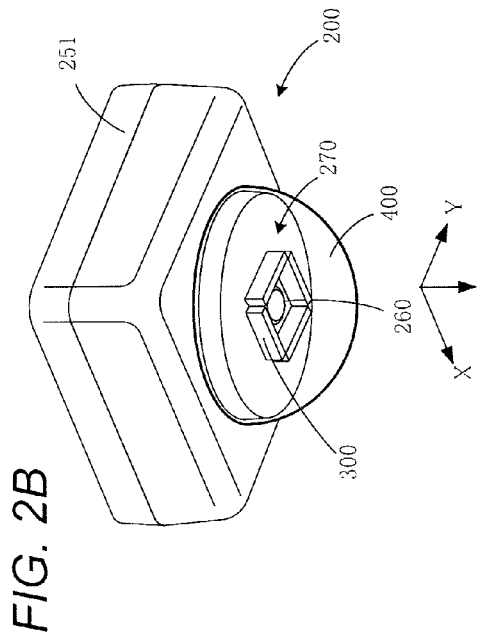
FIG. 2A is a perspective view illustrating an example of a structure in the vicinity of a camera device and a shutter when the shutter is in a closed state in the embodiment.
Figure 2B:
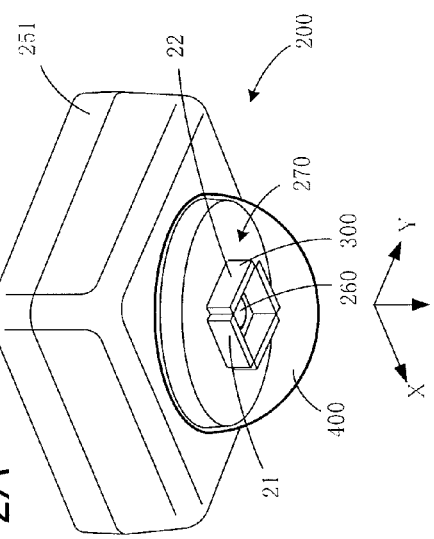
FIG. 2B is a perspective view illustrating an example of a structure in the vicinity of a camera device and a shutter when the shutter is in an intermediate state in the embodiment.
Figure 2C:
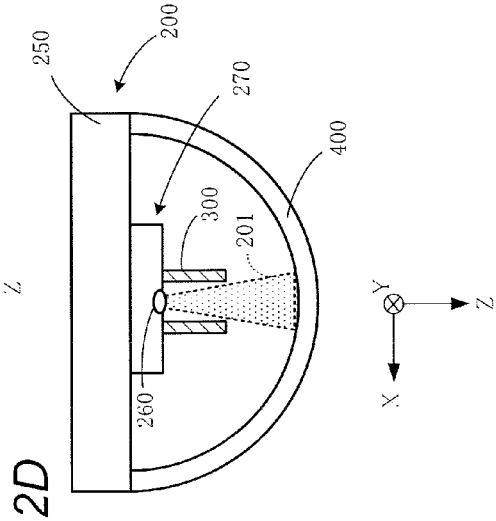
FIG. 2C is a perspective view illustrating an example of a structure in the vicinity of a camera device and a shutter when the shutter is in the open state in the embodiment.
Figure 2D:
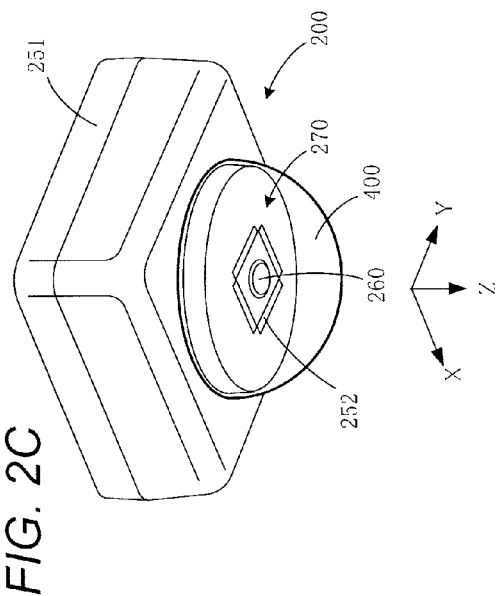
FIG. 2D is a cross-sectional view illustrating an example of a structure in the vicinity of a camera device and a shutter in the embodiment.

Next, an example of a structure in the vicinity of the camera device 200 and the shutter 300 will be described. FIGS. 2A to 2D are perspective views illustrating the structure in the vicinity of the camera device 200 and the shutter 300. FIG. 2A illustrates a case of the shutter 300 being in a closed state. FIG. 2B illustrates a case of an intermediate state where the shutter 300 is in the state between the open state and the closed state. FIG. 2C illustrates a case of the shutter 300 being in an open state. FIG. 2D is a cross-sectional view illustrating the example of the structure in the vicinity of the camera device 200 and the shutter 300 illustrated in FIG. 2A.

In FIGS. 2A to 2D, the camera device 200 includes at least an optical unit 270 and a camera base 250. The camera device 200 is covered with a housing 251 and a transparent cover 400.

The optical unit 270 is mounted on the camera base 250 via a predetermined holding mechanism. The optical unit 270 includes a camera lens 260 and a lens holder. The camera based 250 is installed and fixed, for example on the wall or ceiling in a predetermined area. An unillustrated board is incorporated in a housing 251 of the camera base 250. Various electronic components are mounted on the board. The electronic components include, for example, components for supplying a power to the components in the camera device 200, outputting some images, or executing image processing, and include a digital signal processor (DSP) as described later.

FIG. 2A illustrates the state of the shutter 300 being closed. In this case, since the shutter 300 has a tubular hollow shape (here in a substantially square columnar hollow shape), the optical unit 270 cannot be visually recognized from an area except for a predetermined position (for example, from right below the camera device 200). In addition, in a case where the shutter 300 is in the closed state, an image capturing area 201 of the camera device 200 is limited to the area without the shutter 300, which is the state of the image capturing being difficult.

The open and closed state of the shutter 300 is changed by a drive member (not illustrated). In a case where the shutter 300 is in the open state by an operation of the drive member as illustrated in FIG. 2C, at least a part of the substantially tubular-shaped shutter 300 is opened by being moved toward the camera base 250, and is accommodated, for example, in a shutter receiving part 252 of the camera base 250. In a case where the shutter 300 is in the open state, the optical unit 270 can be visually recognized from the front of the image capturing direction. In a case where the camera base 250 is mounted on the ceiling, for example, it means that the front of the image capturing direction is a downward direction (positive direction on a Z-axis).

The camera base 250 may include a drive member for opening and closing the shutter 300. The board may be incorporated in the optical unit 270.

The transparent cover 400 is formed of, for example, a transparent material and a translucent material, and surrounds the shutter 300 which houses or exposes the camera device 200. The optical unit 270 is, even in a case where the shutter 300 is in the open state, surrounded by the camera base 250 (refer to FIG. 2A) and the transparent cover 400. The transparent material and the translucent material include, for example, polymethyl methacrylate (PMMA) and polycarbonate (PC).

By covering the optical unit 270 with the transparent cover 400, the camera device 200 can have, for example, excellent waterproofness, dust resistance and light resistance. By applying a hydrophilic coating on the surface of the transparent cover 400, it is possible to improve weather resistance of the transparent cover 400 itself. In addition, influence by the transparent cover 400 on the captured image is equal to or lower than a predetermined level, and it is possible to sufficiently secure the security by analyzing the captured image.

Next, the configuration example of the control device 100 will be described.

Figure 3:
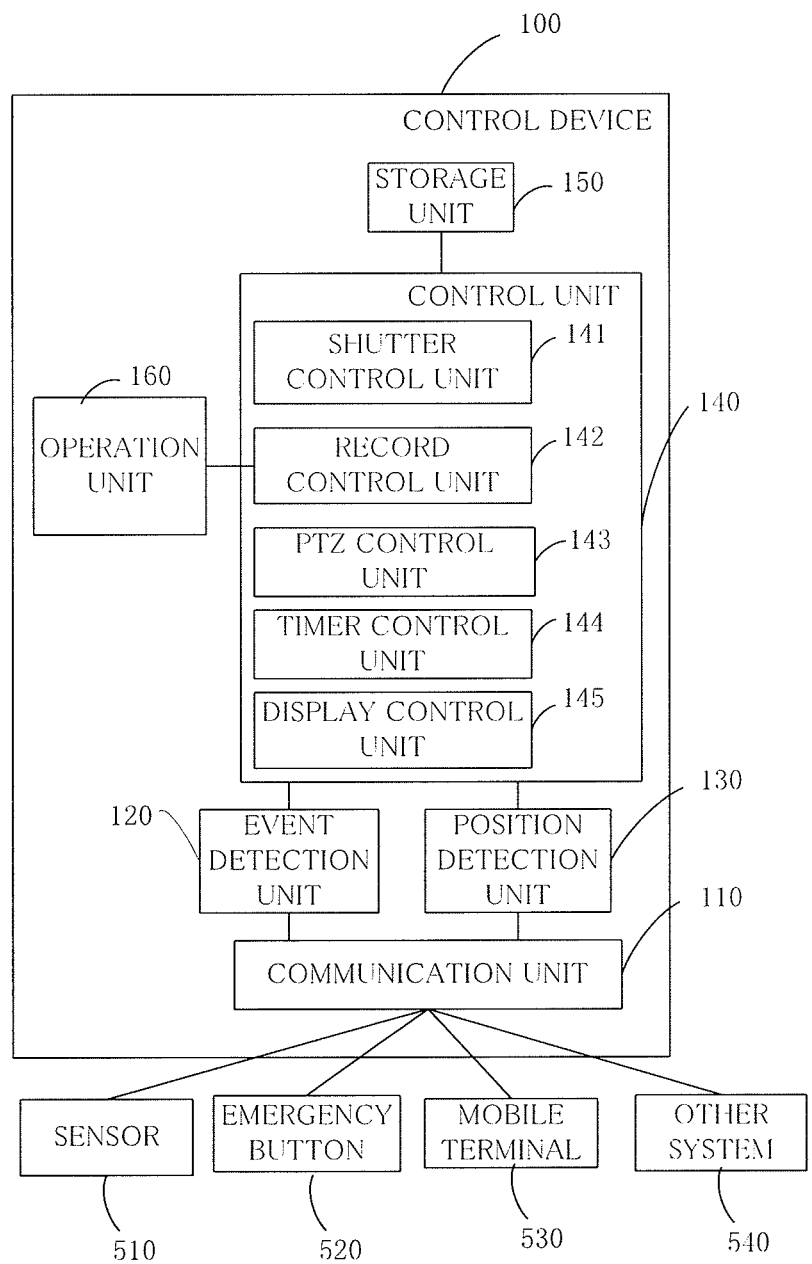
FIG. 3 is a block diagram illustrating a configuration example of a control device in the embodiment.

FIG. 3 is a block diagram illustrating the configuration example of the control device 100. The control device 100 includes a communication unit 110, an event detection unit 120, a position detection unit 130, a control unit 140, a storage unit 150, and an operation unit 160.

The communication unit 110 communicates various kinds of information, for example, with the sensors 510, the emergency button 520, the mobile terminal 530, or the other system 540. The communication unit 110 may communicate via the wired network or via the wireless network. In addition, the communication unit 110 may perform communication such as infrared communication, short range communication, and others.

The communication unit 110 receives the measured information measured by the sensors 510 or information indicating that the emergency button 520 is pressed. In addition, for example, the communication unit 110 receives the information detected by the mobile terminal 530 or the information indicating that a predetermined button is pressed. In addition, the communication unit 110 receives the information obtained by a processing in the other system 540.

The event detection unit 120 detects an event of opening and closing of the shutter 300 based on information received by the communication unit 110 from each device. The event includes, for example, an opening event for opening the shutter 300 and a closing event for closing the shutter 300. For example, the opening event is detected in a case where the threat level is comparatively high, and the closing event is detected in a case where the threat level is comparatively low. The state where the threat level is comparatively high includes, for example, a state where the sensor 510 reacts, and the state where the threat level is comparatively low includes, for example, a state where the sensor 510 does not react.

The event detection unit 120 determines that it is the opening event in a case where, for example, the emergency button 520 is pressed and the emergency warning is received by the communication unit 110 and in a case where information of an authentication error is received by the communication unit 110. In addition, the event detection unit 120 determines that it is the opening event in a case where, for example, a suspicious person enters the predetermined area (for example, in a classroom) and the information is reported by a teacher's mobile terminal.

In addition, the event detection unit 120 determines that it is the opening event in a case where, for example, a suspicious person is detected in the visiting and leaving management system or in a case where an authentication error is detected in the authentication system.

In addition, the event detection unit 120 determines that it is the closing event in a case where, for example, the teacher in class requests via a smart phone for the shutter 300 to be closed for the protection of the privacy, and the request signal is received by the communication unit 110. In addition, the event detection unit 120 determines that it is the closing event in a case where a predetermined amount of time has passed since the opening event is detected (received).

The position detection unit 130 identifies a device that transmits the information received by the communication unit 110, and detects a position where the device exists or is installed. The position may be detected, for example, using an Internet Protocol (IP) address of the camera device 200 arranged in a predetermined area or a Media Access Control (MAC) address. In addition, the position may be detected using a host name that is uniquely given to the camera device 200. In addition, for example, in a case where the device is a mobile device, the position may be detected using the Global Positioning System (GPS).

The control unit 140 integrally administrates each unit in the control device 100. In addition, the control unit 140 includes a shutter control unit 141, a record control unit 142, a PTZ control unit 143, a timer control unit 144, and a display control unit 145. The control unit 140 realizes various functions by, for example, a control program stored in the storage unit 150 being executed by a CPU.

The shutter control unit 141 controls the opening and closing of the shutter 300. The record control unit 142 controls such that the image captured by the camera device 200 is recorded, or the voice collected by the microphone is recorded.

The PTZ control unit 143 instructs the camera device 200 to perform, for example, the PTZ control in a predetermined timing. For example, the PTZ control unit 143 controls the image capturing area or the image capturing direction of the camera device 200 according to the position information of the sensor 510 which detects a predetermined event.

The timer control unit 144 measures, for example, current time or any period of time. For example, the display control unit 145 generates a display screen from the image captured by the camera device 200, and instructs the display device 600 so as to display the display screen, according to the screen size of the display device 600.

The storage unit 150 stores various kinds of information, various programs, and information about various tables. In addition, for example, information of the image captured by the camera device 200 and information of the voice collected by the camera device 200 may be obtained from the camera device 200 via the communication unit 110, and may be stored in the storage unit 150.

The operation unit 160 receives various operations. As an operation unit 160, which can instruct the control unit 140, for example, a key input unit, a predetermined button, a mouse, a keyboard, a microphone, and a touch panel can be considered.

Figure 4:
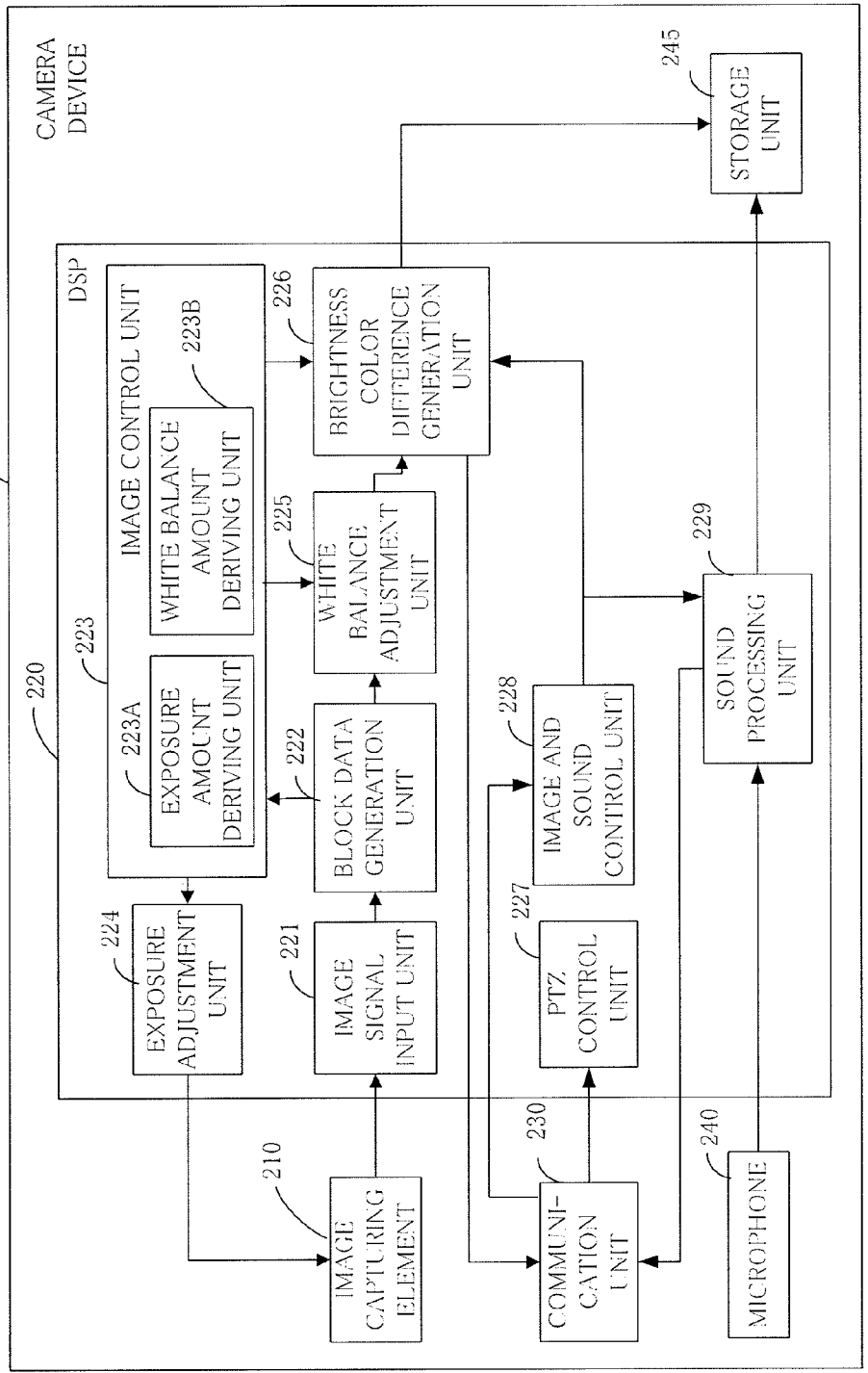
FIG. 4 is a block diagram illustrating a configuration example of a camera device in the embodiment.

Next, a configuration example of the camera device 200 will be described. FIG. 4 is a block diagram illustrating the configuration example of the camera device 200. The camera device 200 includes an image capturing element 210, a Digital Signal Processor (DSP) 220, and a communication unit 230.

The image capturing element 210 includes, for example, a Charge Coupled Device (CCD) or a Complementary Metal Oxide Semiconductor (CMOS) image sensor. The DSP 220 performs a predetermined signal processing with respect to the image signal obtained from the image capturing element 210.

The communication unit 230 is connected to the control device 100 via the network, and communicates with the control device 100 on various kinds of information. The network may be either a wired network or a wireless network. The communication unit 230 receives, for example, information about the direction of the camera device 200, or control information (for example, panning control information, tilt control information or zoom control information) which controls the image capturing area, from the control device 100.

In addition, the communication unit 230 may receive, for example, detection information or information about the detection result from the sensor 510, the emergency button 520, the mobile terminal 530, and at least one of the other systems 540. In this case, the communication unit 230 transmits the received information to the control device 100, and the opening and closing control of the shutter 300 is performed by the control device 100.

In the present embodiment, the shutter 300 is controlled by the control device 100. Alternatively, the shutter 300 may be controlled by the camera device 200. In this case, the control signal is transmitted to the shutter 300 from the communication unit 230, and the opening and closing control of the shutter 300 is performed.

The microphone 240 acquires a sound signal (for example, a voice) surrounding the microphone 240 to convert the signal to an electric signal.

The storage unit 245 stores various kinds of information, various programs, and information about various tables. In addition, the information about the camera device 200 kept in the control device 100 may be kept in the storage unit 245 of the camera device 200.

The DSP 220 includes an image signal input unit 221, a block data generation unit 222, an image control unit 223, an exposure adjustment unit 224, a white balance adjustment unit 225, and a brightness color difference generation unit 226. In addition, the DSP 220 includes a PTZ control unit 227, a record control unit 228, and a sound processing unit 229.

The image signal input unit 221 receives an image signal from the image capturing element 210. The block data generation unit 222 divides all of the pixels of the image capturing element 210 into a plurality of blocks with a predetermined size, adds a pixel value to a color filter (each RGB filter) for each divided block, and generates block data.

The image control unit 223 includes, for example, an exposure amount deriving unit 223A and a white balance amount deriving unit 223B. The exposure amount deriving unit 223A receives the block data from the block data generation unit 222 and derives (for example, calculates) an exposure amount based on the block data. The white balance amount deriving unit 223B receives the block data from the block data generation unit 222 and derives a white balance amount based on the block data.

The exposure adjustment unit 224 adjusts the exposure amount of the image capturing element 210 using the exposure amount derived by the exposure amount deriving unit 223A. The white balance adjustment unit 225 adjusts the white balance of the block data using the white balance amount derived by the white balance amount deriving unit 223B.

The brightness color difference generation unit 226 generates brightness data Y, and color difference data Cb and Cr as exemplified below is adjusted, from the block data (RGB data) of the white balance.

$$Y=0.299 \times R+0.587 \times G+0.114 \times B$$

$$Cb==-0.169 \times R-0.331 \times G+0.500 \times B$$

$$Cr=0.500 \times R-0.419 \times G-0.081 \times B$$

The PTZ control unit 227 controls, for example, the direction of the camera device 200 based on the control information received by the communication unit 230. For example, the PTZ control unit 227 may control the direction in a horizontal direction of the camera device 200 based on the panning control information from the control device 100. In addition, the PTZ control unit 227 may control the direction in a vertical direction of the camera device 200 based on the tilt control information from the control device 100. The PTZ control unit 227 causes, for example, a motor (not illustrated) to rotate and causes the camera device 200 to pan or tilt for each predetermined angle.

In addition, the PTZ control unit 227 may control the image captured by the camera device 200 so as to be enlarged (zoom-in) or reduced (zoom-out) based on the zoom control information from the control device 100. In a case where the direction of the camera device 200 is controlled, the direction of the entire camera device 200 may be controlled or the direction of the camera lens 260 of the camera device 200 may be controlled.

In a case where the camera device 200 is an omni-directional camera, the PTZ control in the camera device 200 is implemented in software.

The record control unit 228, for example, controls such that the image captured by the image capturing element 210 is recorded and the voice collected by the microphone 240 is recorded in the storage unit 245, according to the instruction signal (control signal) from the control device 100. In addition, the record control unit 228, for example, controls such that the recording of the captured image is stopped and the recording of the collected voice is stopped according to the instruction signal from the control device 100.

The recorded image or sound information to be stored in the storage unit 245 may be stored in other memory than the storage unit 245. For example, the information may be stored in an external storage medium such as an SD card mounted on the camera device 200 or the like. In addition, for example, the information may be transmitted to the control device 100 and be kept in the control device 100.

The sound processing unit 229 performs a predetermined signal processing with respect to an electric signal from the microphone 240.

Moreover, the case where the microphone 240 collecting the surrounding sound in the predetermined area is included in the camera device 200 is illustrated. However, the microphone 240 may be provided separate from the camera device 200.

Next, the environment for installation of the camera device 200 will be described.

The camera device 200 is, for example, installed on the ceiling or on the wall surface in a predetermined privacy-sensing area where both the security securing and the privacy protection are required. The privacy-sensing area is one of the predetermined areas. The privacy-sensing area is, for example, a part or the whole of a company, a classroom, a restroom, a dressing room, a library, a locker room, or a conference room.

In each privacy-sensing area, a privacy threshold value is assigned depending on importance of the privacy protection. For example, when the importance of the privacy protection is higher, a larger value is assigned as a privacy threshold value, and when the importance of the privacy protection is lower, a smaller value is assigned as a privacy threshold value. For example, in the privacy-sensing area such as in a restroom or a dressing room, a comparatively larger privacy threshold value is assigned, and in the privacy-sensing area such as in a library, a comparatively smaller privacy threshold value is assigned. When the privacy threshold value assigned is comparatively large, for example, in a case where a predetermined event is detected by a plurality of sensors 510, the shutter 300 is merely opened but the captured image is not recorded. Thus the privacy can be protected as much as possible. In addition, when the privacy threshold value assigned is comparatively small, for example, even in a case where a predetermined event is detected by one sensor 510, the captured image is recorded while the shutter 300 is opened. Thus, the privacy is not protected compared to the case where the privacy threshold value is large.

For example, for each privacy-sensing area, one or more camera devices 200 are installed. In addition, the camera device 200 for which the privacy-sensing area is included in the image capturing area may be installed outside the privacy-sensing area.

In addition, the sensor 510 and the emergency button 520 may be installed, for example, in the privacy-sensing area. The mobile terminal 530 may, for example, be owned by a user located in the privacy-sensing area. At least a part of the other system 540, for example, may or may not be installed in the privacy-sensing area.

The image capturing area of the camera device 200 includes, for example, at least a part of the detection range of one or more sensors 510 installed in a fixed manner or at least a part of the target warning range of the emergency button 520. Each camera device 200 is preset so that the direction of each camera device 200 is adjusted in such a manner that the predetermined privacy-sensing area is included in the image capturing area. In addition, the number of preset position of each camera device 200 may be more than one, for example, the preset position may be prepared in advance for each sensor 510 which detects the information regarding the occurrence of an abnormality. In this case, for example, the sensor 510 which detects the information regarding the occurrence of the abnormality and the information regarding the preset position of the camera device 200 are stored in the control device 100 or in each camera device 200 in advance in association with each other.

Figure 5:
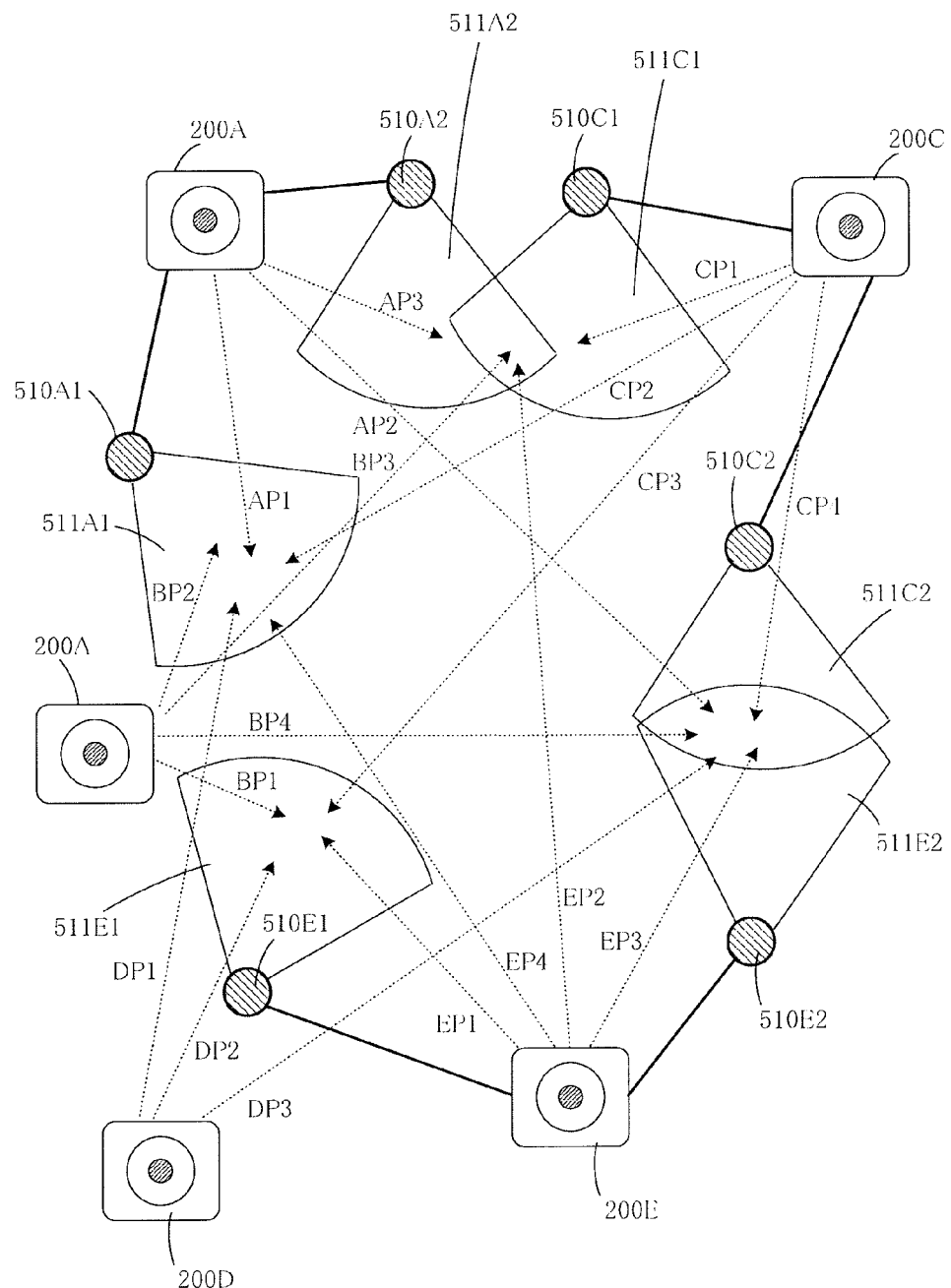
FIG. 5 is a schematic diagram illustrating an example of an arrangement of camera devices, an example of an arrangement of sensors, an example of image capturing areas of the camera devices, and an example of detection ranges of the sensors in the embodiment.

FIG. 5 is a schematic diagram illustrating an arrangement example of the camera devices 200, an arrangement example of the sensors 510, an example of image capturing areas of the camera devices 200, and an example of detection ranges of the sensors 510. As illustrated in FIG. 5, five camera devices 200 (200A to 200E) and 6 sensors (510A1, 510A2, 510C1, 510C2, 510E1, and 510E2) are installed in the privacy-sensing area. Here, a description mainly related to the camera device 200A will be given.

In FIG. 5, the sensors 510A1 and 510A2 are connected to and three preset positions AP1 to AP3 are set to the camera device 200A. The sensors 510C1 and 510C2 are connected to and four preset positions CP1 to CP4 are set to the camera device 200C. The sensors 510E1 and 510E2 are connected to and four preset positions EP1 to EP4 are set to the camera device 200E. Moreover, the sensor 510 is not connected to either of the camera devices 200B or 200D, and four preset positions BP1 to BP4 are set to the camera device 200B and three preset positions DP1 to DP30 are set to the camera device 200D.

For example, the preset position AP1 is corresponding to the detection range 511A1 of the sensor 510A1, preset position AP2 is corresponding to the detection ranges 511C2 and 511E2 of the sensors 510C2, 510E2, respectively, and the preset position AP3 is corresponding to the detection ranges 511A2 and 511C1 of the sensors 510A2 and 510C1, respectively.

That is, when the camera lens 260 of any one of the camera devices 200A to 200E is turned to the preset position AP1, it is possible to capture an image including the detection range 511A1 of the sensor 510A1. In addition, when the camera lens 260 of any one of the camera devices 200A to 200E is turning to the preset position AP2, it is possible to capture an image including the detection ranges 511C2 and 511E2 of the sensors 510C2 and 510E2, respectively. In addition, when the camera lens 260 of any one of the camera devices 200A to 200E is turning to the preset position AP3, it is possible to capture an image including the detection ranges 511A2 and 511C1 of the sensors 510A2 and 510C1.

In FIG. 5, a case where a plurality of the camera devices 200 and the sensors 510 are installed in one privacy-sensing area is illustrated. Alternatively, for example, the privacy-sensing area may be divided by a wall surface, and the camera devices 200 may be installed for each divided privacy-sensing area.

FIG. 6 is a schematic diagram illustrating an example of an information table T11 which indicates the relationship between each sensor 510 and a preset position of each camera device 200. The information table T11 is stored in the storage unit 150.

The information table T11 holds, for example, the identification information (for example, IP address) of each camera device 200A to 200E and the identification information (for example, sensor ID) of each sensor 510 in association with each other. The information table T11 includes, for example, information indicating that the preset position AP1 of the camera device 200A (IP address: IpA) is corresponding to the detection range 511A1 of the sensor 510A1. In addition, the information table T11 includes information indicating that the preset position BP2 of the camera device 200B (IP address: IpB) is corresponding to the detection range 511A1 of the sensor 510A1. In addition, the information table T11 includes information indicating that the preset position CP2 of the camera device 200C (IP address: IpC) is corresponding to the detection range 511A1 of the sensor 510A1. In addition, the information table T11 includes information indicating that the preset position DP1 of the camera device 200D (IP address: IpD) is corresponding to the detection range 511A1 of the sensor 510A1. In addition, the information table T11 includes information indicating that the preset position EP4 of the camera device 200E (IP address: IpE) is corresponding to the detection range 511A1 of the sensor 510A1.

In addition, the control device 100 may hold an information table (not illustrated) in which a sensor of another camera having a common detection range is associated with each sensor 510 (for example, sensor 510A1 and 510A2). In the information table, the sensor 510C1 of the camera device 200C is in associated with the sensor 510A2, the IP address of the camera device 200C is stored.

In FIG. 5, a case where the sensors 510 are connected to the camera devices 200 is illustrated. Alternatively, instead of the sensors 510, the emergency button 520, the mobile terminal 530, or the other system 540 may be connected thereto. In addition, at least two of the sensor 510, the emergency button 520, the mobile terminal 530, or the other system 540 may be mixed in the privacy-sensing area.

The detection range 511 may or may not be overlapped by a plurality of sensors 510. In addition, the image capturing area by a plurality of camera devices 200 may or may not be overlapped.

The control device 100 instructs the camera device 200 (for example, the camera device 200A), with reference to the information table T11, to capture the image of a detection range (for example, the detection range 511A1) where an abnormality is expected to occur, for example.

Next, as one example of the other system 540, the visiting and leaving management system 2000 will be described.

Figure 7:
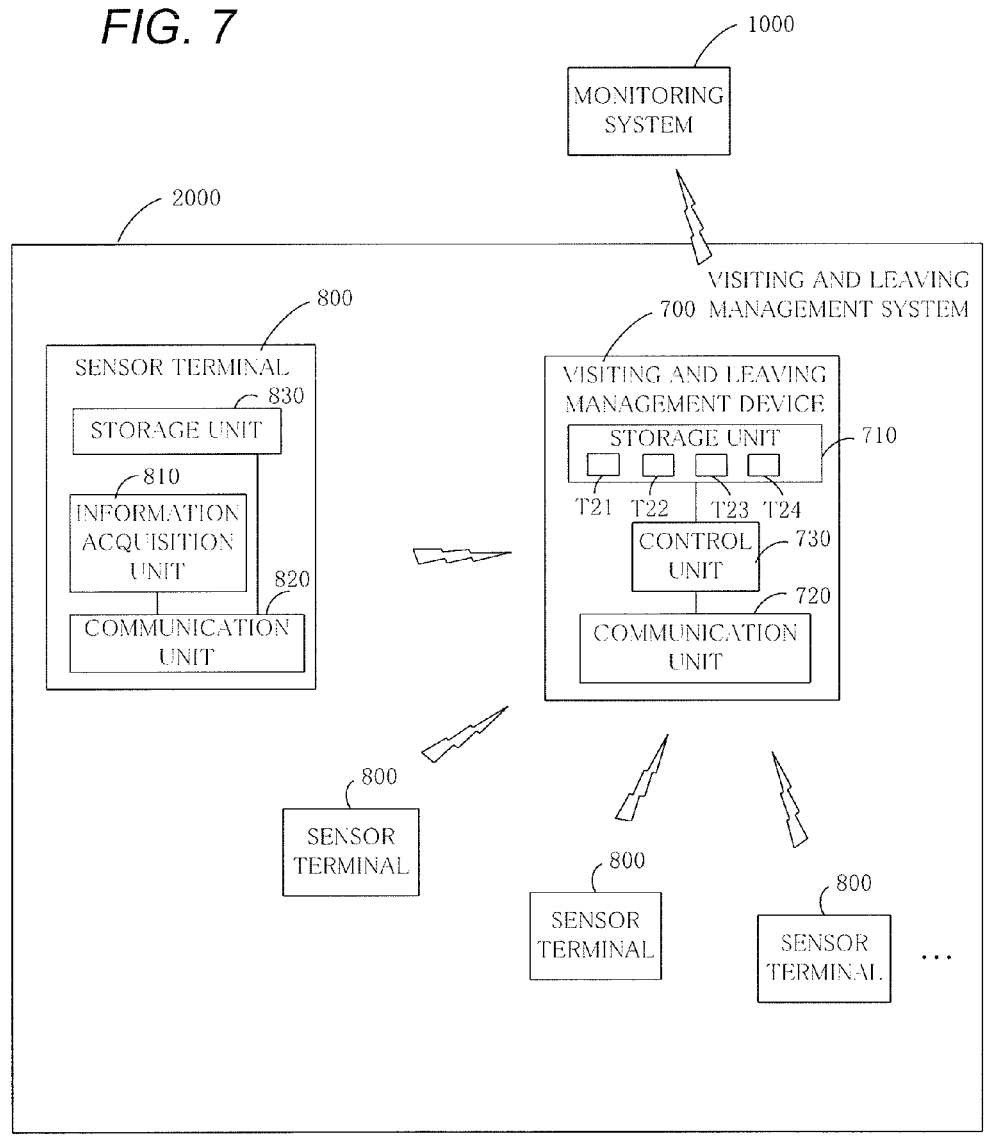
FIG. 7 is a block diagram illustrating a configuration example of a visiting and leaving management system in the embodiment.

FIG. 7 is a block diagram illustrating a configuration example of a visiting and leaving management system 2000. The visiting and leaving management system 2000 includes, for example, a visiting and leaving management device 700 and a sensor terminal 800. The visiting and leaving management device 700 and one or more sensor terminals 800 are connected to each other via a network.

The visiting and leaving management device 700 manages at least one of the visitors who enter a predetermined area and the leaving persons who leave the predetermined area. Here, it is assumed that the visitors or the leaving persons have IC cards for the management of visiting and leaving, but not limited to the IC card. In addition, for example, the functions of IC cards may be incorporated in the mobile terminal. The sensor terminal 800 is installed inside or outside of the predetermined area where the visiting and leaving is managed.

The sensor terminal 800 includes an information acquisition unit 810, a communication unit 820, and a storage unit 830. The sensor terminal 800 includes, for example, a memory and a processor, and realizes various functions (for example, an IC card reading function, an information transmission function) by the CPU executing a control program stored in the memory. Moreover, each function may be realized by a dedicated hardware instead of the software.

The information acquisition unit 810 acquires various kinds of information. For example, the information acquisition unit 810 is a card reader, and reads the card ID stored in the IC card from the IC card which is held by the bearer of the IC card, and informs the communication unit 820.

The communication unit 820 communicates, for example, various kinds of information to the visiting and leaving management device 700 via a wired network or a wireless network. For example, the communication unit 820 transmits the information about the card ID from the information acquisition unit 810 and the information about the terminal ID which identifies the sensor terminal and is stored in the storage unit 830, to the visiting and leaving management device 700.

The visiting and leaving management device 700 includes a storage unit 710, a communication unit 720, and a control unit 730.

The storage unit 710 stores various kinds of information, various tables, and a control program. The storage unit 710 stores, for example, a sensor signal holding table T21, a card information holding table T22, a visitor information holding table T23, and a leaving information holding table T24. Adding, modifying, and removing data to and from the sensor signal holding table T21 and the card information holding table T22 are implemented based on the input to the operation unit (not illustrated).

The communication unit 720 communicates with another communication device or another system (for example, the monitoring system 1000) via a wired network or a wireless network. For example, with respect to the monitoring system 1000, the communication unit 720 transmits the information on whether or not a person exists in the predetermined area. In addition, with respect to the monitoring system 1000, when a person's visiting or leaving occurs in the predetermined area, the communication unit 720 may sequentially transmit the information on the visiting or leaving (for example, information on the visitor, the leaving person, the visiting time, the leaving time, the visiting area, and the leaving area).

The control unit 730 realizes, for example, various functions (for example, an authentication processing function, a visitor information generation function, and a leaving determination function) by an execution of the control program stored in the storage unit 710 by a CPU. Moreover, various functions may be realized by a dedicated hardware instead of the software. The information on visiting and leaving is held, for example, in the visitor information holding table T23 and the leaving information holding table T24.

The sensor information holding table T21 has information indicating a correspondence between each sensor and the area where each sensor is installed. The sensor information holding table T21 holds, for each sensor terminal 800, for example, information on the sensor ID, the installation area, the area ID, and the name of area in association with each other. The sensor information holding table T21 is referenced in the authentication processing.

The sensor ID is identification information which identifies the sensor terminal 800. The installation area indicates information about the location where the sensor terminal 800 is installed. The area ID is identification information which identifies the area where predetermined information is detected by the sensor terminal 800.

The card information holding table T22 has information indicating a correspondence between the IC card used for visiting and leaving and the area where the visiting and leaving is permitted by each IC card. The card information holding table T22 holds, for each IC card, for example, information on the card ID, the name, and the permitted area ID in association each other. The card information holding table T22 is referenced in the authentication processing.

The card ID is identification information which is recorded in the IC card and identifies the IC card. The name is an IC card bearer's name, for example. The permitted area ID is identification information which identifies the area where the visiting and leaving is permitted by the IC card.

The visitor information holding table T23 has information indicating a correspondence between each visitor and the area each visitor has entered. The visitor information holding table T23 holds, for each visitor, for example, information on the visitor card ID, the visitor's name, the visiting area ID, the visiting area name, and the visiting time in association with each other. The visitor information holding table T23, for example, is referenced in a case where the control unit 730 determines whether the visitor information is recorded or removed, and is updated according to the determination result.

The visitor card ID is identification information which identifies the IC card used when the visitor enters. The ID card is included in the card ID held in the card information holding table T22. The visitor's name is, for example, a name of the visitor. The visiting area ID is identification information which identifies the area where the visitor enters, and is an area ID held in the sensor information holding table T21 in association with the sensor ID of the sensor terminal 800 installed in the area. The visiting area name is the area name held in the sensor information holding table T21 in association with the corresponding area ID.

The leaving information holding table T24 has, for example, at the time point when the shutter 300 is opened, information indicating the leaving status of the visitor who has entered each area, at a predetermined time point. The leaving information holding table T24 holds, for each entering visitor when the shutter 300 is in the open state, the card ID, the name, the area ID, the area name, and the leaving information in association with each other. The leaving information holding table T24 is, for example, referenced when the control unit 730 determines the leaving, and is updated.

The visitor's card ID, the visitor's name and the visiting area name in the leaving information holding table T24, for example, are similar to the visitor's card ID, the visitor's name, and the visiting area name held in the visitor information holding table T23 at the time point when the shutter 300 is in the open state. In addition, the leaving information is information indicating whether the visitor has left or not.

The storage unit 710 may not include the leaving information holding table T24, and when the visitor has left, the control unit 730 may remove the information about the visitor who has left, from the visitor information holding table T23. Even in this case, a person in the area can be recognized.

Here, separately from the monitoring system 1000, a case of the visiting and leaving management system 2000 is described. Alternatively, the configuration units of the monitoring system 1000 and the configuration units of the visiting and leaving management system 2000 may be partly at least in common. For example, at least a part of the storage unit, the communication unit, the control unit, the area (the privacy-sensing area), and the sensor (the sensor terminal) may be partly shared in both systems.

Figure 8:
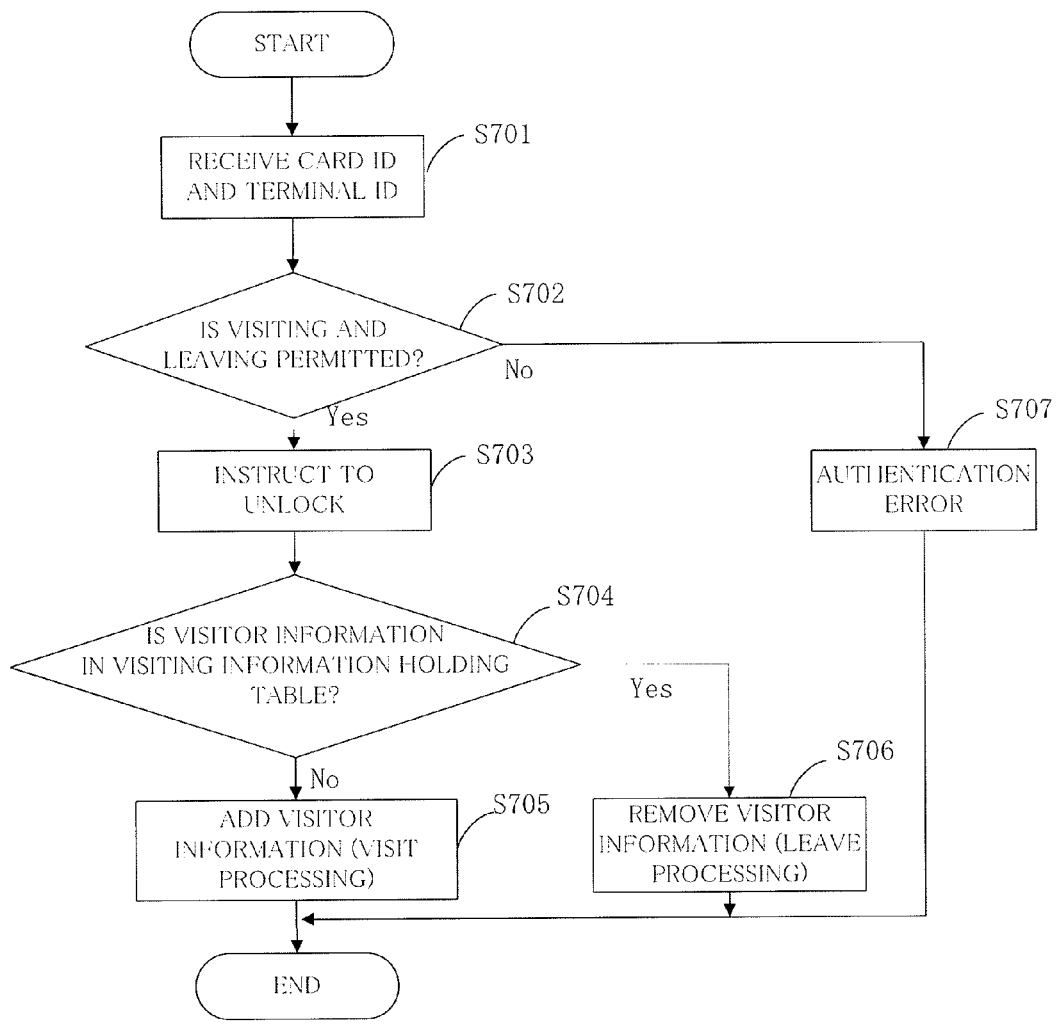
FIG. 8 is a flowchart illustrating an example of an operation of the visiting and leaving management system in the embodiment.

Next, an example of an operation of the visiting and leaving management device 700 will be described. FIG. 8 is a flowchart illustrating the example of the operation of the visiting and leaving management device 700.

First, the communication unit 720 receives the information about the card ID and the terminal ID from the sensor terminal 800 which the IC card approaches (S701).

Subsequently, the control unit 730 determines whether or not the visiting of the area where the sensor terminal 800 which the IC card approaches is installed or the leaving from such area is permitted (S702). For example, the control unit 730 determines whether or not the visiting and leaving is permitted in a case where the area ID held in the sensor information holding table T21 in association with the received terminal ID is included in the permitted area ID held in the card information holding table T22 in association with the received card ID. In a case where the visiting and leaving is not permitted, the control unit 730 determines the authentication error (S707), and the process in FIG. 8 ends.

In a case where the visiting and leaving is permitted, the communication unit 720 transmits, for example, an instruction to the sensor terminal to which the IC card approaches, to unlock the door provided at the predetermined area (S703).

Subsequently, the control unit 730 determines whether or not the visitor information which includes the received card ID and the area ID held in the sensor information holding table T21 in association with the received terminal ID are included in the visitor information holding table T23 (S704).

In a case where the visitor information is not included in the visitor information holding table T23, the control unit 730 adds the visitor information to the visitor information holding table T23, and the visiting process ends (S705).

On the other hand, in a case where the visitor information is included in the visitor information holding table T23, the control unit 730 removes the visitor information from the visitor information holding table T23, and the leaving process ends (S706).

Here, a case where the visitor information about the visitor already entered is removed as a leaving person is illustrated. Alternatively, the visiting and leaving may be determined by the terminal ID. For example, in a case where the IC card approaches the sensor terminal 800 installed in the area other than the predetermined area, the visiting and leaving management device 700 or the sensor terminal 800 may determine that the bearer of the IC card is visiting. In addition, in a case where the IC card approaches the sensor terminal 800 installed in the area within the predetermined area, the visiting and leaving management device 700 or the sensor terminal 800 may determine that the bearer of the IC card is leaving.

In this way, according to the visiting and leaving management system 2000, it is possible to grasp presence or absence of the visitor in the predetermined area. The visiting and leaving management system 2000 may provide the monitoring system 1000 with the information about the visitor in the predetermined area (for example, the information about the presence or the absence of the visitor at least a part of information included in the visitor information holding table T23) via the network. The control device 100 of the monitoring system 1000 acquires, for example, the information about the visitor from the visiting and leaving management system 2000, and may open and close the shutter 300 according to the presence or the absence of the visitor.

Next, the time table T12 held in the storage unit 150 of the control device 100 in the monitoring system 1000 will be described.

Figure 9:
FIG. 9 is a schematic diagram illustrating an example of a time table that includes information about the opening and closing of the shutter, an implementation state of the image recording, and an implementation state of sound recording in each time zone in the embodiment.

FIG. 9 is a schematic diagram illustrating an example of the time table T12. The time table T12 includes, for example, information about the opening and closing state of the shutter 300, the implementation state of the image recording, and the implementation state of sound recording in each time zone. The time table T12 is stored in the storage unit 150.

In FIG. 9, on holidays, the monitoring system 1000 sets the operation mode as a monitoring mode for the entire day (0:00 to 24:00), implements the sound recording, implements the image recording, and causes the shutter 300 to be in the open state. For example, in a case of monitoring an office, since it is estimated that employees may not exist in the office on holiday, priority to the security can be given in such a time zone.

In addition, as illustrated in FIG. 9, from 08:30 to 17:00 on weekdays, the monitoring system 1000 sets the operation mode as a non-monitoring mode, does not implement the sound recording, does not implement the image recording, and causes the shutter 300 to be in the closed state. For example, in a case of monitoring the office, since it is assumed that employees may exist in the office during work hours, priority to the privacy can be given in such a time zone.

In addition, as illustrated in FIG. 9, in 00:00 to 08:30 and 17:00 to 24:00 on weekdays, the monitoring system 1000 sets the operation mode as the monitoring mode, implements the sound recording, implements the image recording, and causes the shutter 300 to be in the open state. For example, in a case of monitoring an office, since it is estimated that a few employees may exist in the office during work-off hours, priority to the security can be given in that time zone.

Next, the example of operation of the control device 100 in a case where the shutter 300 is open and closed according to the time schedule in the time table T12 will be described. Here, two examples of operation are illustrated. A first example of operation illustrates an example of operation when the shutter 300 is open and closed under the consideration of the schedule. A second example of operation illustrates an example of operation when the shutter 300 is open and closed under the consideration of threat level as an example of an event.

Figure 10:
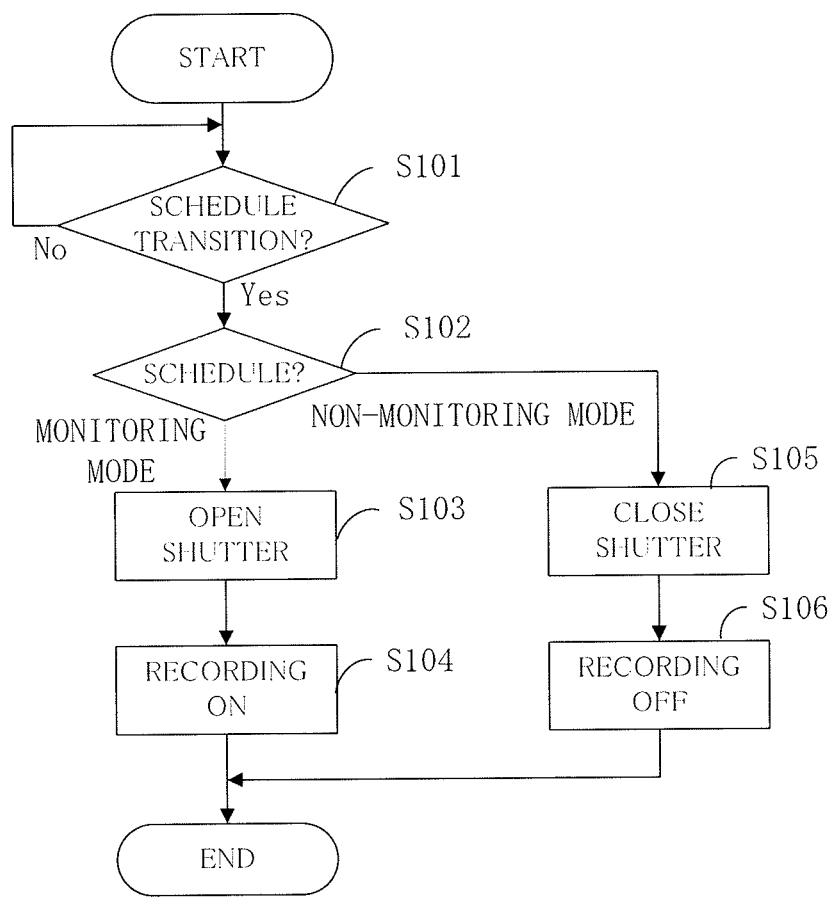
FIG. 10 is a flowchart illustrating a first example of operation of the control device in a case where the shutter is open and closed in the embodiment.

FIG. 10 is a flowchart illustrating an example of the first operation of the control device 100 in a case where the shutter 300 is open and closed.

First, the timer control unit 144 acquires information about the current time. The shutter control unit 141 determines whether or not the current time indicates a time of schedule transition with reference to the time table T12 (S101). In a case where the current time does not indicate the time of schedule transition, the step S101 is performed again.

In a case where the current time indicates the time of schedule transition, the shutter control unit 141 determines, with reference to the time table T12, whether the current time is in the time zone for monitoring mode or in the time zone for non-monitoring mode (S102). The time zone in S102 is the time zone after the schedule transition.

In a case where the current time is in the time zone for monitoring mode, the shutter control unit 141 transmits an instruction signal so as to open the shutter 300 via the communication unit 110 (S103). In addition, the record control unit 142, transmits an instruction signal via the communication unit 110 so as to start collecting the sound by the microphone 240 of the camera device 200 and to start image capturing by the image capturing element 210 (S104).

In a case where the current time is in the time zone for non-monitoring mode, the shutter control unit 141 transmits an instruction signal with respect to the camera device 200 via the communication unit 110 so as to close the shutter 300 (S105). In addition, the record control unit 142 transmits an instruction signal via the communication unit 110 so as to stop collecting the sound by the microphone 240 of the camera device 200 and to stop image capturing by the image capturing element 210 (S106).

According to the first example of operation of the control device 100, the monitoring system 1000 can operate according to the operation modes (monitoring mode and non-monitoring mode) which change depending on the schedule. In a case of the monitoring mode, the priority can be given to the securing of the security. In a case of the non-monitoring mode, the priority can be given to the protection of the privacy.

In FIG. 9 and FIG. 10, a case is illustrated where the image capturing and the sound collecting by the camera device 200 are implemented at the same time. Alternatively, the image capturing and the sound collecting may be implemented at different times. That is, in the monitoring mode, only the sound collecting may be implemented without capturing the image, or only the image capturing may be implemented without collecting the sound.

Next, the example of operation of the control device 100 in a case where the shutter 300 is open and closed depending on the threat level will be described.

Figure 11:
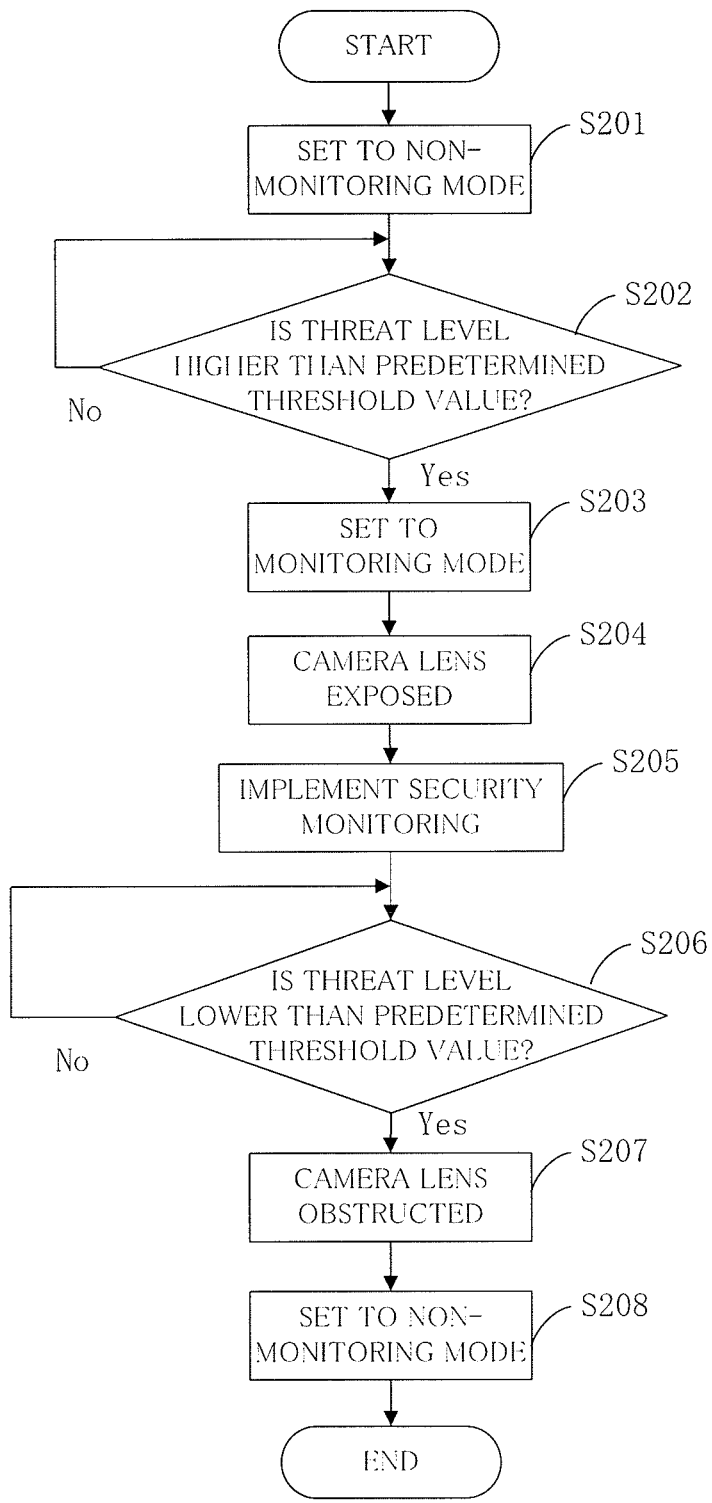
FIG. 11 is a flowchart illustrating a second example of the operation of the control device in a case where the shutter is open and closed in the embodiment.

FIG. 11 is a flowchart illustrating a second example of operation of the control device 100 in a case where the shutter 300 is open and closed. Moreover, in the second example of operation, a case where the threat level is high is an example of a case where an opening event occurs. In addition, a case where the threat level is low is an example of a case where the opening event does not occur or a closing event occurs.

In the second example of operation, the control unit 140 basically sets the operation mode of the monitoring system 1000 to the non-monitoring mode (S201). In the non-monitoring mode, the camera lens 260 is physically obstructed from the privacy-sensing area.

In a case where there is a threat at a high level, needs for safety and security take a higher priority than the need for the privacy. The threat at a high level includes, for example, a situation of a hostage or a fired shot. When the threat level exceeds a predetermined threshold value (S202), the control unit 140 transitions the operation mode to the monitoring mode (S203).

The case where the threat level exceeds a predetermined privacy threshold value, for example, includes a case where the emergency button 520 is pressed, a case where the effect that the emergency state is reported from the mobile terminal 530, and a case where a predetermined dangerous state is detected by the sensor 510.

In the monitoring mode, the shutter control unit 141 controls in such a manner that the shutter 300 is open, which enables the camera lens 260 be obstructed, and the shutter 300 moves to the position where the camera lens 260 is exposed (S204). In this way, the camera device 200 can monitor the privacy-sensing area and it is possible to secure the security with respect to the privacy-sensing area where the camera device 200 is disposed (S205).

After the step S205, after passing a predetermined time, for example, when a closing event occurs and the threat level is lower than the predetermined privacy threshold value (S206), the need for the privacy takes a higher priority than needs for the safety and the security. In this case, the shutter control unit 141 controls in such a manner that the shutter 300 is closed, and the shutter 300 returns to the position where the camera lens 260 is obstructed (S207). In addition, the control unit 140 transits the operation mode to the non-monitoring mode (S208).

The case where the threat level is lower than the predetermined threshold value, for example, includes a case where the pressing of the emergency button 520 is stopped, a case where an effect that the emergency state is terminated is notified from the mobile terminal 530, a case where the predetermined dangerous state is not detected by the sensor 510, and a case where a predetermined time has passed since the threat level exceeded the predetermined privacy level threshold value.

According to the second example of operation of the control device 100, in a case where the threat level is comparatively high, it is possible to strengthen the security. In addition, in a case where the threat level is comparatively low, for example, by using the state that the camera device 200 is obstructed from the outside, it is possible to realize the state in which a person in the privacy-sensing area does not feel the discomfort of being monitored.

Next, a description will be made of variations of shapes of the shutter 300. The shutter 300 and a base including a hole in which the shutter 300 is received (the shutter receiving part 252, for example) may be referred to together as a shutter apparatus.

FIGS. 2A to 2C illustrate the shutter 300 which is formed in a substantially square columnar hollow shape. The shutter 300 includes a restricting member, and is formed by using, for example, four light blocking plates which are substantially rectangular. For this reason, it is difficult to confirm the camera lens 260 through the plates, and it is difficult for the camera device 200 to capture an image. In addition, all the plates in the shutter 300 may have or may not have the same shape or the same size as each other.

Figure 12A:
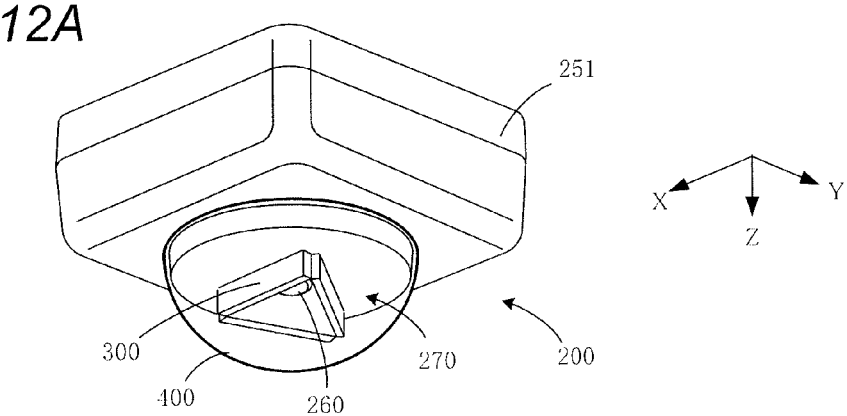
FIG. 12A is a perspective view illustrating a first modification example of a structure in a vicinity of a camera device and a shutter in a case where the shutter is in a closed state according to the embodiment.
Figure 12B:
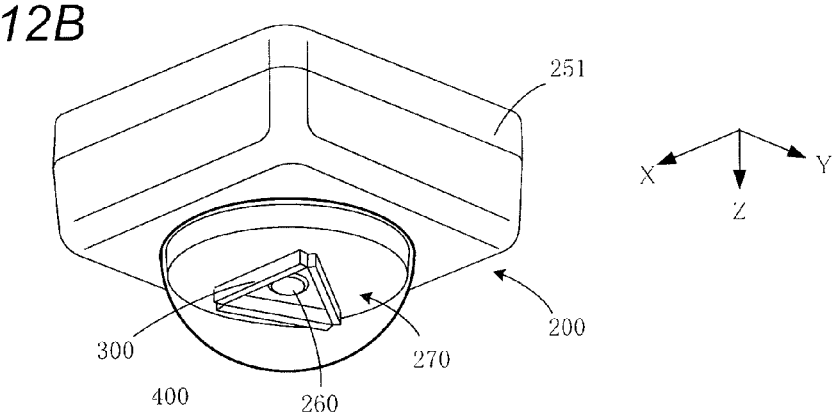
FIG. 12B is a perspective view illustrating the first modification example of the structure in the vicinity of the camera device and the shutter in a case where the shutter is in an intermediate state according to the embodiment.
Figure 12C:
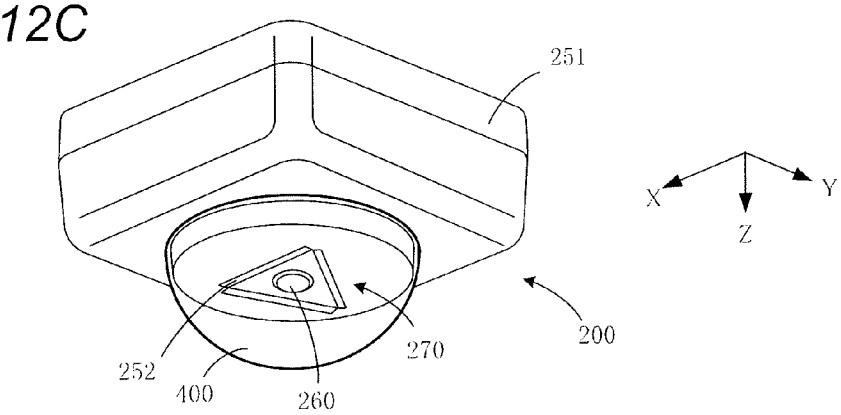
FIG. 12C is a perspective view illustrating the first modification example of the structure in the vicinity of the camera device and the shutter in a case where the shutter is in an open state according to the embodiment.

FIGS. 12A to 12C are perspective views illustrating a first modification example of a structure in the vicinity of the camera device 200 and the shutter 300. FIG. 12A illustrates a case where the shutter 300 is in a closed state. FIG. 12B illustrates a case where the shutter 300 is in an intermediate state. FIG. 12C illustrates a case where the shutter 300 is in an open state.

In the first modification example, the shutter 300 is formed in a substantially triangular columnar hollow shape. The shutter 300 is formed by using, for example, three light blocking plates which are substantially rectangular. For this reason, it is difficult to confirm the camera lens 260 through the plates, and it is difficult for the camera device 200 to capture an image. In addition, all the plates in the shutter 300 may have or may not have the same shape or the same size as each other.

In addition, the shutter 300 may be formed in polygonal columnar hollow shapes other than the substantially triangular columnar hollow shape or the substantially square columnar hollow shape.

Figure 13A:
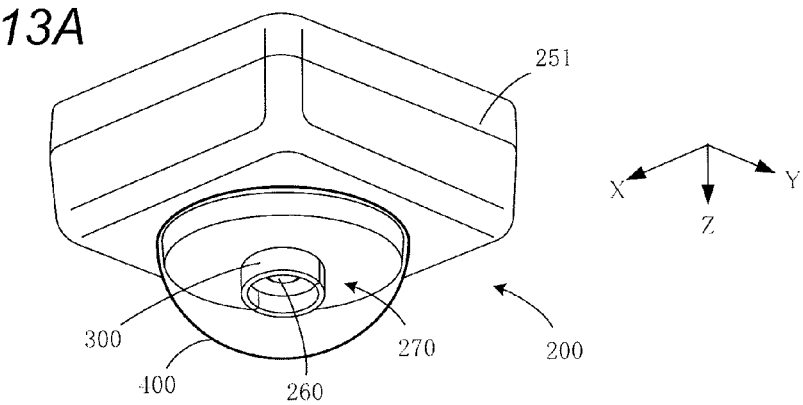
FIG. 13A is a perspective view illustrating a second modification example of a structure in a vicinity of a camera device and a shutter in a case where the shutter is in a closed state according to the embodiment.
Figure 13B:
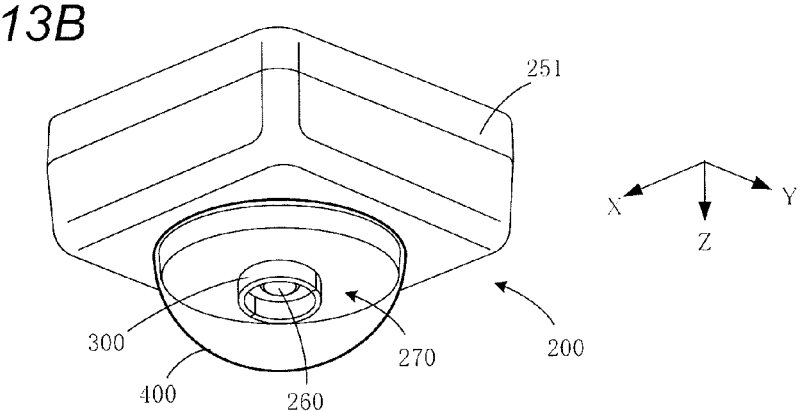
FIG. 13B is a perspective view illustrating the second modification example of the structure in the vicinity of the camera device and the shutter in a case where the shutter is in an intermediate state according to the embodiment.
Figure 13C:
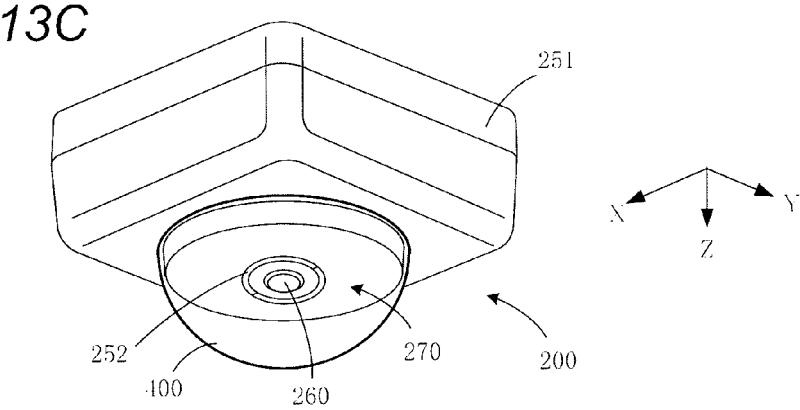
FIG. 13C is a perspective view illustrating the second modification example of the structure in the vicinity of the camera device and the shutter in a case where the shutter is in an open state according to the embodiment.

FIGS. 13A to 13C are perspective views illustrating a second modification example of a structure in the vicinity of the camera device 200 and the shutter 300. FIG. 13A illustrates a case where the shutter 300 is in a closed state. FIG. 13B illustrates a case where the shutter 300 is in an intermediate state. FIG. 13C illustrates a case where the shutter 300 is in an open state.

In the second modification example, the shutter 300 is formed in a substantially circular cylinder hollow shape. The shutter 300 is formed by using, for example, two light blocking plates having a substantially rectangular shape, which are curved. This curved surface follows, for example, a semispherical surface. In addition, all the curved plates in the shutter 300 may have or may not have the same shape or the same size as each other. Further, the shutter 300 may be formed in a substantially circular cylinder hollow shape by using three or more curved plates.

Therefore, in a case where the shutter 300 is in a closed state, an image-capturing area is limited, and thus it is possible to protect privacy of a person who is present at areas other than the image capturing area in a privacy-sensing area. For example, in a case where the camera device 200 is installed on a ceiling, an image capturing area is limited to a direction directly under the ceiling. In addition, since an image capturing area is not limited in a case where the shutter 300 is in an open state, security can be ensured.

Since the camera device 200 is not completely surrounded by the shutter 300 even in a state in which the shutter 300 is closed, light is introduced into the shutter 300, and thus exposure adjustment is easily performed. For example, in a case where the camera device 200 is installed on a ceiling, the shutter 300 is not present in a direction directly under the ceiling.

In addition, the shutter 300 is divided into a plurality of plates (walls) in any case of FIGS. 2A to 2C, FIGS. 12A to 12C, and FIGS. 13A to 13C. In other words, a configuration of the shutter 300 is divided on the X-Y plane. The plurality of plates can be operated independently. For example, in FIG. 2A, all the plates forming a tubular shape may be accommodated in the camera base 250, and may extend from the camera base 250. In addition, only a first plate 21 may be accommodated in the camera base 250, and only a second plate 22 may extend from the camera base 250.

As mentioned above, each plate in the shutter 300 can be operated independently, and thus it is possible to implement a privacy mask. For example, in a state in which the shutter 300 is open, in a case where a right half of an image capturing area is an imaging prohibition area (for example, private property), the shutter 300 may be in a state (extension state) in which a predetermined plate thereof is closed and may be in a state (storage state) in which other plates are opened, so as to mask only the right side. Thus, it is possible to reliably protect privacy in the imaging inhibition area, and to ensure security in the imaging permission area.

In FIGS. 2A to 2C, FIGS. 12A to 12C, and FIGS. 13A to 13C, in a case where the shutter 300 transitions from a closed state to an open state, the plates of the shutter 300 extend from the shutter receiving part 252 of the camera base 250 so as to be perpendicular to the housing 251. In addition, the plates of the shutter 300 may extend with a predetermined angle with respect to the housing 251.

Figure 14A:
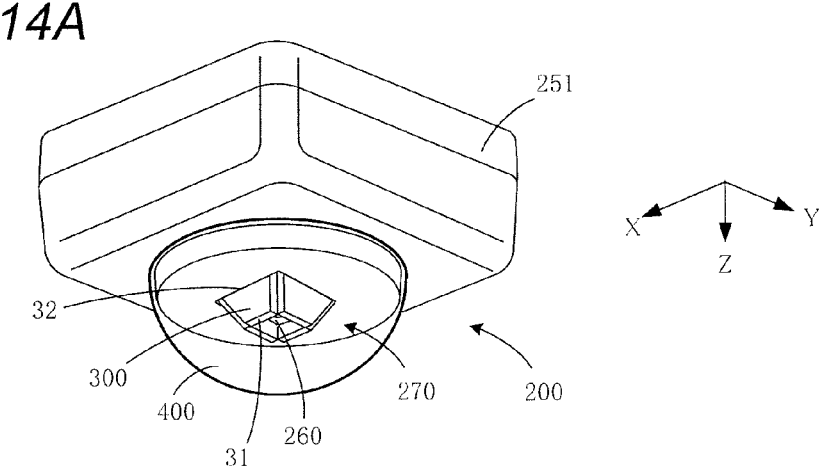
FIG. 14A is a perspective view illustrating a third modification example of a structure in a vicinity of a camera device and a shutter in a case where the shutter is in a closed state according to the embodiment.
Figure 14B:
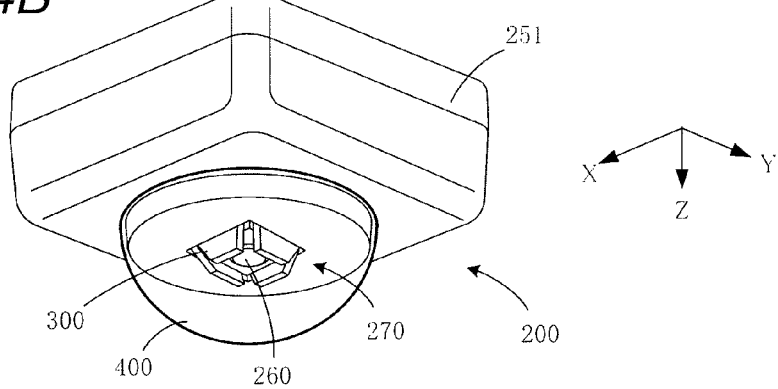
FIG. 14B is a perspective view illustrating the third modification example of the structure in the vicinity of the camera device and the shutter in a case where the shutter is in an intermediate state according to the embodiment.
Figure 14C:
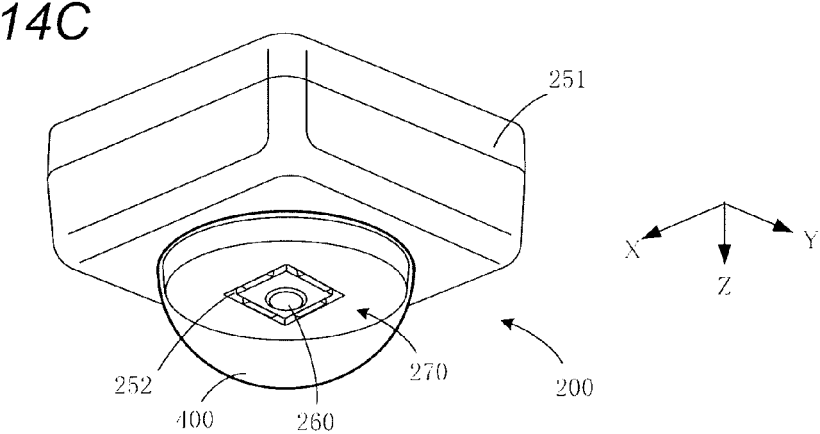
FIG. 14C is a perspective view illustrating the third modification example of the structure in the vicinity of the camera device and the shutter in a case where the shutter is in an open state according to the embodiment.

FIGS. 14A to 14C are perspective views illustrating a third modification example of a structure in the vicinity of the camera device 200 and the shutter 300. FIG. 14A illustrates a case where the shutter 300 is in a closed state. FIG. 14B illustrates a case where the shutter 300 is in an intermediate state. FIG. 14C illustrates a case where the shutter 300 is in an open state.

Figure 15A:
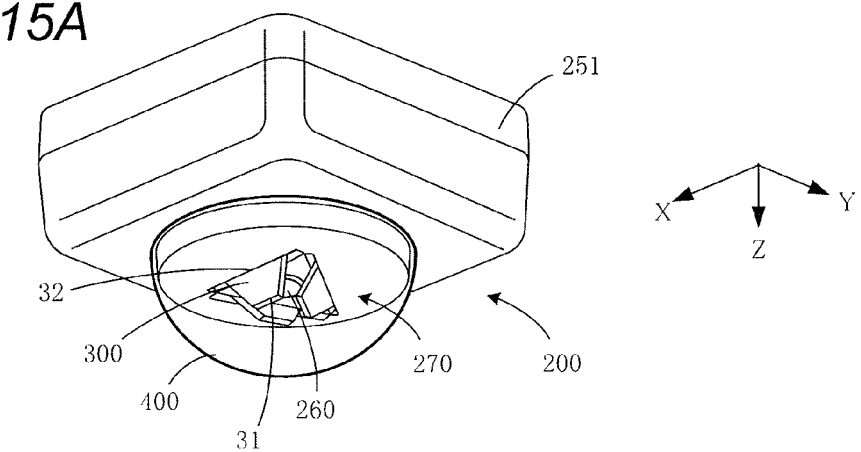
FIG. 15A is a perspective view illustrating a fourth modification example of a structure in a vicinity of a camera device and a shutter in a case where the shutter is in a closed state according to the embodiment.
Figure 15B:
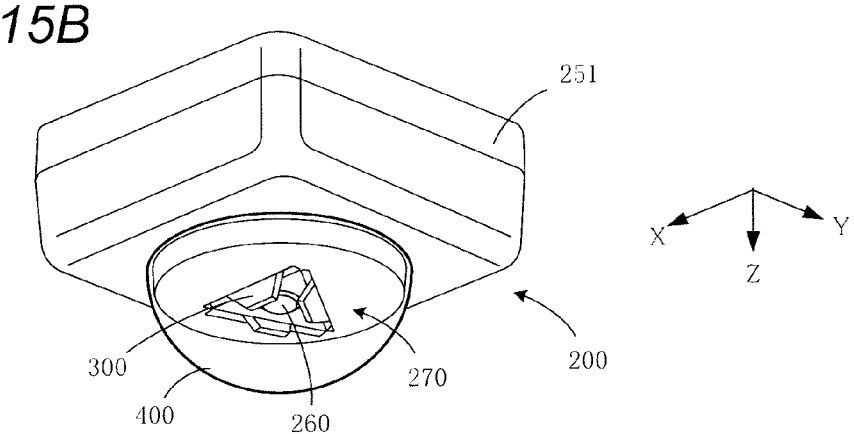
FIG. 15B is a perspective view illustrating the fourth modification example of the structure in the vicinity of the camera device and the shutter in a case where the shutter is in an intermediate state according to the embodiment.
Figure 15C:
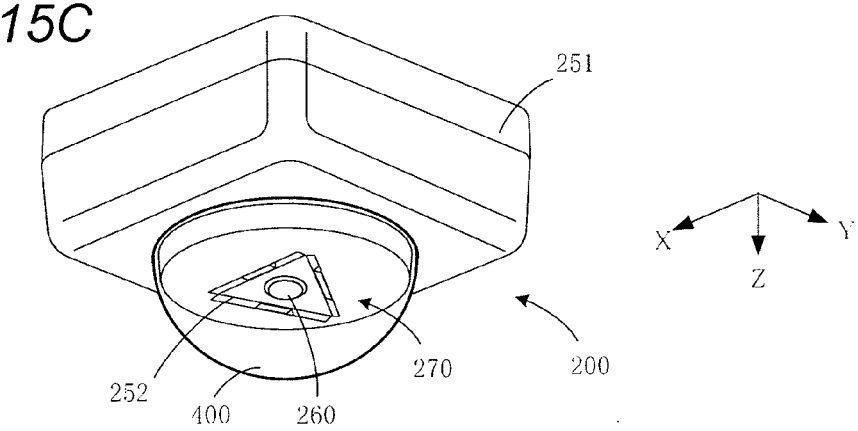
FIG. 15C is a perspective view illustrating the fourth modification example of the structure in the vicinity of the camera device and the shutter in a case where the shutter is in an open state according to the embodiment.

FIGS. 15A to 15C are perspective views illustrating a fourth modification example of a structure in the vicinity of the camera device 200 and the shutter 300. FIG. 15A illustrates a case where the shutter 300 is in a closed state. FIG. 15B illustrates a case where the shutter 300 is in an intermediate state. FIG. 15C illustrates a case where the shutter 300 is in an open state.

The third modification example is a modification example of a case where the shutter 300 is formed in a substantially square columnar hollow shape, and shows a case where the predetermined angle is 45 degrees. The fourth modification example is a modification example of a case where the shutter 300 is formed in a substantially triangular columnar hollow shape, and shows a case where the predetermined angle is 45 degrees.

In the third and fourth modification examples, the plates of the shutter 300 are oblique with respect to the housing 251 at a predetermined angle (here, 45 degrees), and thus a shape of the plate is a substantially trapezoidal shape. In this case, as illustrated in FIGS. 14A and 15A, a side 31 parallel to the X-Y plane which is located at a positive Z axis side is shorter than a side 32 parallel to the X-Y plane which is located further toward a negative Z axis side than the side 31. The positive Z axis side is a side (a second side) which is far from the installation surface where the camera base 250 is installed. The negative Z axis side is a side (a first side) close to the installation surface of the camera base 250.

Therefore, even if image capturing areas of the camera device 200 are the same as each other, a height (a length in the Z axis direction) of the camera base 250 which accommodates the shutter 300 can be made shorter in a case where the plates of the shutter 300 have a predetermined angle with respect to the housing 251 of the camera base 250 than in a case where the plates of the shutter 300 are perpendicular to the housing 251 of the camera base 250. In other words, the camera base 250 can be thinned. In addition, the predetermined angle may be angles (for example, 35 degrees and 50 degrees) other than 45 degrees.

As mentioned above, in the monitoring system 1000, the shutter 300 is formed in a tubular shape by using a plurality of plates (walls), and the plurality of plates can be operated independently. Thus, for example, some of the plates are in an open state, and thus the shutter 300 may be used as a privacy mask. Therefore, it is possible to flexibly protect privacy, and to improve convenience of the shutter 300.

In addition, since some light is introduced into the shutter 300 even in a state in which the shutter 300 is closed, it is possible to perform exposure adjustment even in the state in which the shutter 300 is closed. In addition, it is possible to reduce an exposure adjustment amount after the shutter 300 is opened, and thus to reduce the exposure adjustment time.

Further, in a case where the shutter 300 is accommodated in the transparent cover 400, for example, the durability thereof can be improved, and the shutter 300 is rarely destroyed.

In a camera system of the related art, the shutter is not accommodated in the camera base even in an open state. In addition, the shutter is integrally formed with a surface disposed along an installation surface of the camera base, and thus is not formed so as to be divided. In contrast, the shutter 300 of the present embodiment is accommodated in the camera base 250 in a case where the shutter 300 is in an open state, and thus an image capturing area is broader in an open state of the shutter 300 than when the shutter 300 is not accommodated in the camera base. In addition, the shutter 300 of the present embodiment is formed so as to be divided on the surface disposed along the installation surface of the camera base 250, and thus can be separately operated to be opened and or to be closed as compared with a case where the shutter is integrally formed. Therefore, it is possible to flexibly protect privacy in a predetermined direction.

In addition, the present invention is not limited to the configurations of the above-described embodiments, and may employ any configuration as long as the configuration can achieve the functions shown in the claims, or the functions of the constituent elements of the present embodiments.

For example, in the embodiment, an intermediate state of the shutter 300 may be provided in a plurality of steps. FIGS. 16A to 16D are cross-sectional views illustrating an example of a relationship between stepwise open and closed states of the shutter 300 and an image capturing area in each step.

Figure 16A:
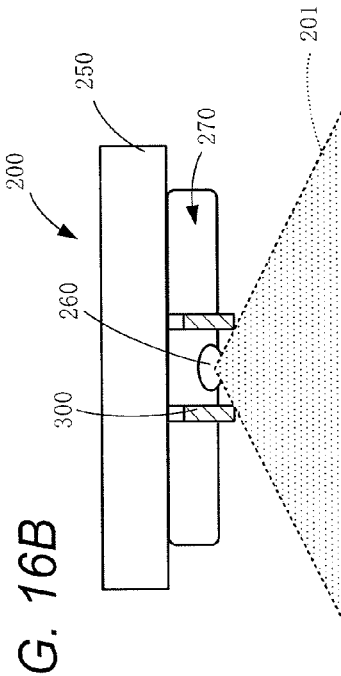
FIGS. 16A to 16D are schematic diagrams illustrating an example of a relationship between open and closed states of the shutter and an image capturing area of the camera device.

FIG. 16A illustrates a state (open state) in which the shutter 300 is completely open. The open state is a state in which all plates of the shutter 300 are accommodated in the shutter receiving part 252 of the camera base 250.

Figure 16B:
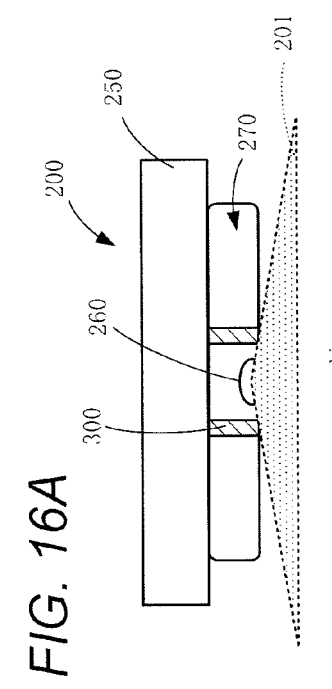

FIG. 16B illustrates a state (intermediate state) in which the shutter 300 is closed by ⅓. The state in which the shutter is closed by ⅓ is a state in which the plates of the shutter 300 are accommodated in the shutter receiving part 252 of the camera base 250 by ⅔.

Figure 16C:
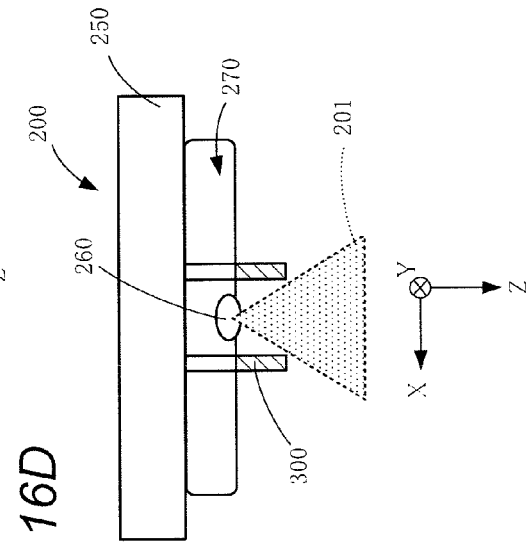

FIG. 16C illustrates a state (intermediate state) in which the shutter 300 is closed by ⅔. The state in which the shutter is closed by ⅔ is a state in which the plates of the shutter 300 are accommodated in the shutter receiving part 252 of the camera base 250 by ⅓.

Figure 16D:
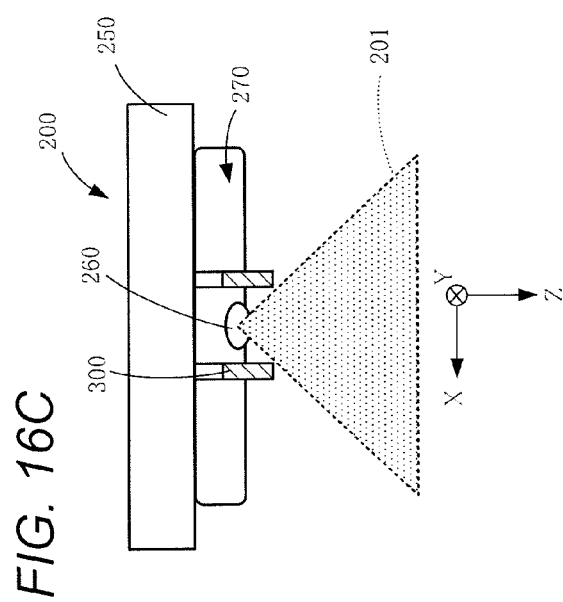

FIG. 16D illustrates a state (closed state) in which the shutter 300 is fully closed. The closed state is a state in which the plates of the shutter 300 are not accommodated in the shutter receiving part 252 of the camera base 250.

The open and closed states (including an open state, a plurality of intermediate states, and a closed state) of the shutter 300 may be determined depending on, for example, a time schedule, whether or not an event occurs, a type of occurring event, a priority of protecting privacy, and a priority of ensuring security. In addition, a user may set the open and closed states of the shutter 300 by using the operation unit 160 of the control device 100.

Since an intermediate state of the shutter 300 is provided in a plurality of steps, an image capturing area of the camera device 200 can be finely set, and thus it is possible to flexibly change an image capturing area depending on the importance of protecting privacy or importance of ensuring security.

In addition, in the embodiment, the entire circumference of the camera device 200 on the X-Y plane is surrounded by the shutter 300, but part of the circumference of the camera device 200 may not be surrounded by the shutter 300. For example, in a case where the camera device 200 is installed on a ceiling surface so as to be close to a wall surface of a privacy-sensing area (for example, a classroom), a plate which is disposed so as to be close to the wall surface may be omitted. Also in this case, the entire circumference of the camera device 200 is surrounded by the plates of the shutter 300 and the wall surface when the shutter 300 is in an open state, and thus it is possible to strengthen protection of privacy.

In addition, in the embodiment, an example has been described in which the shutter 300 is divided on a plane (X-Y plane) parallel to the installation surface of the camera device 200, but the shutter 300 may be divided on the X-Y plane and in the Z axis direction. In a case where the shutter 300 is divided in the Z axis direction, a length of the plate of the shutter 300 in the Z axis direction is reduced, and thus the camera base 250 can be thinned. When the shutter 300 is accommodated and protruded by superimposing the plates of the shutter 300 in a thickness direction, a length of each plate of the shutter 300 in the Z axis direction is reduced, and thus the camera base 250 can be further thinned.

Further, in the embodiment, in a case where the shutter 300 is closed, the camera device 200 may or may not perform image capturing.

Furthermore, in the embodiment, even in a case where the shutter 300 is closed, a captured image may be periodically transmitted to the control device 100.

In addition, in the embodiment, the shutter 300 may be provided outside the transparent cover 400.

Further, in the embodiment, sound collecting or sound recording using the microphone of the camera device 200 may be omitted.

In addition, in the embodiment, the event priority and the schedule priority may be reversed to each other. For example, the schedule priority may be set when the shutter 300 is turned to an open state. In this case, unless an operation mode transitions to the monitoring mode according to a schedule even if an opening event is detected, the shutter 300 is not opened. Thus, it is possible to prioritize ensuring of security.

Further, in the embodiment, it is assumed that there is a closing event or a closing schedule (non-monitoring mode), but a duration of an opening event may be set in advance. In this case, the shutter 300 may be turned to a closed state after a predetermined time has elapsed from the start of an opening event or the start of the monitoring mode.

In addition, the embodiment has mainly exemplified that the control device 100 transmits various instruction signals to the camera device 200, and the camera device 200 is operated on the basis of the instruction signals. Further, the camera device 200 may detect various events, and may be autonomously operated.

SUMMARY OF ASPECTS OF THE INVENTION

An aspect of the present invention provides a shutter apparatus that limits an image capturing area of an image-capturing apparatus for capturing an image, the shutter apparatus including: a base in which a hole is formed; and a restricting member that surrounds the image-capturing apparatus, wherein the restricting member is divided into a plurality of members, each being operated independently, and received and protruded through the hole of the base.

According to this configuration, the restricting member is partly operated so as to limit an image capturing area in a predetermined direction, and thus it is possible to flexibly protect privacy. In addition, the restricting member is partly operated so as to cancel the limitation of an image capturing area in a predetermined direction, and thus it is possible to flexibly ensure security. Further, since the shutter is formed in a tubular shape, light can be introduced into the shutter even in a case where the shutter is closed. Therefore, exposure adjustment can be easily performed when the shutter is opened.

The shutter apparatus may be configured so that the restricting member is stepwise operated in accordance with a control signal from a monitoring apparatus that controls the shutter apparatus.

According to this configuration, in a case where the shutter is closed, an image capturing area in a predetermined direction can be limited to a desired area.

The shutter apparatus may be configured so that the base includes an attachment surface on which the image-capturing apparatus is attached.

According to this configuration, by attaching the image-capturing apparatus on the attachment surface of the base, the image-capturing area of the image-capturing apparatus is limited by the restricting member of the shutter apparatus.

The shutter apparatus may be configured so that at least one of the plurality of members of the restricting member moves in a direction perpendicular to the base.

According to this configuration, a length of the plate-like member can be reduced in a shutter accommodation direction, and thus a shutter accommodation space can be reduced.

The shutter apparatus may be configured so that at least one of the plurality of members of the restricting member moves in a direction inclined to the base.

According to this configuration, an image capturing area can be limited to a desired area without the respective members of the restricting member contacting or overlapping each other in a state in which the shutter is closed.

The shutter apparatus may be configured so that the restricting member is divided in plural in a direction substantially perpendicular to an installment surface of the base.

According to this configuration, a length of each member of the restricting member can be reduced in a base accommodation direction, and thus a shutter accommodation space can be reduced.

The shutter apparatus may be configured so that the restricting member is formed in a substantially polygonal columnar hollow shape by a plurality of plate-like members.

According to this configuration, for example, the shutter can be formed in a shape based on circumstances of an area where the image-capturing apparatus is disposed, and it is possible to protect privacy or to ensure security.

The shutter apparatus may be configured so that the restricting member is formed in a substantially circular cylinder hollow shape by a plurality of plate-like members.

According to this configuration, for example, the shutter can be formed in a shape based on circumstances of an area where the image-capturing apparatus is disposed, and it is possible to protect privacy or to ensure security.

The shutter apparatus may be configured so that at least one of the plurality of members of the restricting member is formed in a substantially trapezoidal shape having a first side and a second side in parallel to and shorter than the first side, wherein the first side is located closer to an installment surface of the base and the second side is located farther to the installment surface of the base.

According to this configuration, even in a case where the installation surface of the base and a movement direction of the shutter form a predetermined angle, an image capturing area can be limited to a desired area without the respective members of the restricting member contacting or overlapping each other in a state in which the shutter is closed.

Another aspect of the present invention provides an image-capturing apparatus, including: an optical unit including an imaging device that captures an image; an image processor, configured to perform an image processing on the image captured by the imaging device; a shutter member that limits an image capturing area of the imaging device; and a base that supports the optical unit, wherein the shutter member includes a restricting member that surrounds the image-capturing apparatus, wherein the restricting member is divided into a plurality of members, each being operated independently, and received and protruded through a hole of the base.

According to this configuration, the restricting member is partly operated so as to limit an image capturing area in a predetermined direction, and thus it is possible to flexibly protect privacy. In addition, the restricting member is partly operated so as to cancel the limitation of an image capturing area in a predetermined direction, and thus it is possible to flexibly ensure security. Further, since the shutter is formed in a tubular shape, some light can be introduced into the shutter even in a case where the shutter is closed. Therefore, exposure adjustment can be easily performed when the shutter is opened.

The image-capturing apparatus may be configured so that the restricting member is stepwise operated in accordance with a control signal from a monitoring apparatus that controls the shutter member.

According to this configuration, in a case where the shutter is closed, an image capturing area in a predetermined direction can be limited to a desired area.

The image-capturing apparatus may be configured so that the base includes an attachment surface on which the image-capturing apparatus is attached.

According to this configuration, by attaching the image-capturing apparatus on the attachment surface of the base, the image-capturing area of the image-capturing apparatus is limited by the restricting member of the shutter apparatus.

The image-capturing apparatus may be configured so that at least one of the plurality of members of the restricting member moves in a direction perpendicular to the base.

According to this configuration, a length of the plate-like member can be reduced in a shutter accommodation direction, and thus a shutter accommodation space can be reduced.

The image-capturing apparatus may be configured so that at least one of the plurality of members of the restricting member moves in a direction inclined to the base.

According to this configuration, an image capturing area can be limited to a desired area without the respective members of the restricting member contacting or overlapping each other in a state in which the shutter is closed.

The image-capturing apparatus may be configured so that the restricting member is divided in plural in a direction substantially perpendicular to an installment surface of the base.

According to this configuration, a length of each member of the restricting member can be reduced in a base accommodation direction, and thus a shutter accommodation space can be reduced.

The image-capturing apparatus may be configured so that the restricting member is formed in a substantially polygonal columnar hollow shape by a plurality of plate-like members.

According to this configuration, for example, the shutter can be formed in a shape based on circumstances of an area where the image-capturing apparatus is disposed, and it is possible to protect privacy or to ensure security.

The image-capturing apparatus may be configured so that the restricting member is formed in a substantially circular cylinder hollow shape by a plurality of plate-like members.

According to this configuration, for example, the shutter can be formed in a shape based on circumstances of an area where the image-capturing apparatus is disposed, and it is possible to protect privacy or to ensure security.

The image-capturing apparatus may be configured so that at least one of the plurality of members of the restricting member is formed in a substantially trapezoidal shape having a first side and a second side in parallel to and shorter than the first side, wherein the first side is located closer to an installment surface of the base and the second side is located farther to the installment surface of the base.

According to this configuration, even in a case where the installation surface of the base and a movement direction of the shutter form a predetermined angle, an image capturing area can be limited to a desired area without the respective members of the restricting member contacting or overlapping each other in a state in which the shutter is closed.

The present invention is useful for a shutter, an image-capturing apparatus, and the like capable of improving a level of protecting privacy or ensuring security.

What is claimed is:

1. A shutter apparatus that limits an image capturing area of an image-capturing apparatus for capturing an image, the shutter apparatus comprising:
    a base in which a hole is formed; and
    a restricting member that surrounds the image-capturing apparatus, wherein the restricting member is divided into a plurality of members, each being operated independently, and received and protruded through the hole of the base.

2. The shutter apparatus according to claim 1, wherein the restricting member is stepwise operated in accordance with a control signal from a monitoring apparatus that controls the shutter apparatus.

3. The shutter apparatus according to claim 1, wherein the base includes an attachment surface on which the image-capturing apparatus is attached.

4. The shutter apparatus according to claim 1, wherein at least one of the plurality of members of the restricting member moves in a direction perpendicular to the base.

5. The shutter apparatus according to claim 1, wherein at least one of the plurality of members of the restricting member moves in a direction inclined to the base.

6. The shutter apparatus according to claim 1, wherein the restricting member is divided in plural in a direction substantially perpendicular to an installment surface of the base.

7. The shutter apparatus according to claim 1, wherein the restricting member is formed in a substantially polygonal columnar hollow shape by a plurality of plate-like members.

8. The shutter apparatus according to claim 1, wherein the restricting member is formed in a substantially circular cylinder hollow shape by a plurality of plate-like members.

9. The shutter apparatus according to claim 5, wherein at least one of the plurality of members of the restricting member is formed in a substantially trapezoidal shape having a first side and a second side in parallel to and shorter than the first side, wherein the first side is located closer to an installment surface of the base and the second side is located farther to the installment surface of the base.

10. An image-capturing apparatus, comprising:
    an optical unit including an imaging device that captures an image;
    an image processor, configured to perform an image processing on the image captured by the imaging device;

a shutter member that limits an image capturing area of the imaging device; and a base that supports the optical unit, wherein the shutter member includes a restricting member that surrounds the image-capturing apparatus, wherein the restricting member is divided into a plurality of members, each being operated independently, and received and protruded through a hole of the base.

11. The image-capturing apparatus according to claim 10, wherein the restricting member is stepwise operated in accordance with a control signal from a monitoring apparatus that controls the shutter member.

12. The image-capturing apparatus according to claim 10, wherein the base includes an attachment surface on which the image-capturing apparatus is attached.

13. The image-capturing apparatus according to claim 10, wherein at least one of the plurality of members of the restricting member moves in a direction perpendicular to the base.

14. The image-capturing apparatus according to claim 10, wherein at least one of the plurality of members of the restricting member moves in a direction inclined to the base.

15. The image-capturing apparatus according to claim 10, wherein the restricting member is divided in plural in a direction substantially perpendicular to an installment surface of the base.

16. The image-capturing apparatus according to claim 10, wherein the restricting member is formed in a substantially polygonal columnar hollow shape by a plurality of plate-like members.

17. The image-capturing apparatus according to claim 10, wherein the restricting member is formed in a substantially circular cylinder hollow shape by a plurality of plate-like members.

18. The image-capturing apparatus according to claim 14, wherein at least one of the plurality of members of the restricting member is formed in a substantially trapezoidal shape having a first side and a second side in parallel to and shorter than the first side, wherein the first side is located closer to an installment surface of the base and the second side is located farther to the installment surface of the base.

* * * * *